(12) United States Patent
Tanabe et al.

(10) Patent No.: US 10,875,427 B2
(45) Date of Patent: Dec. 29, 2020

(54) ATTACHMENT MEMBER, AND SEAT EQUIPPED WITH AIRBAG MODULE

(71) Applicant: TS TECH CO., LTD., Asaka (JP)

(72) Inventors: Jinichi Tanabe, Tochigi (JP); Hiroshi Baba, Tochigi (JP); Makoto Takeuchi, Tochigi (JP); Hiroshi Izawa, Tochigi (JP); Yoshihisa Kurosaki, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 100 days.

(21) Appl. No.: 16/139,549

(22) Filed: Sep. 24, 2018

(65) Prior Publication Data

US 2019/0023158 A1  Jan. 24, 2019

Related U.S. Application Data

(63) Continuation of application No. 15/111,667, filed as application No. PCT/JP2015/050978 on Jan. 15, 2015, now Pat. No. 10,081,276.

(30) Foreign Application Priority Data

Jan. 16, 2014 (JP) ................................ 2014-006211
Jan. 28, 2014 (JP) ................................ 2014-013661
Feb. 4, 2014 (JP) ................................ 2014-019633

(51) Int. Cl.
*B60N 2/42* (2006.01)
*B60R 21/207* (2006.01)

(52) U.S. Cl.
CPC .............. *B60N 2/42* (2013.01); *B60R 21/207* (2013.01); *B60R 2021/2076* (2013.01)

(58) Field of Classification Search
CPC .. B60N 2/42; B60R 21/207; B60R 2021/2076
See application file for complete search history.

(56) References Cited

U.S. PATENT DOCUMENTS 5,810,389 A  9/1998  Yamaji et al.
6,431,548 B1  8/2002  Voigt, IV et al.
(Continued)

FOREIGN PATENT DOCUMENTS

CN  102427970 A  4/2012
CN  104936831 A  9/2015
(Continued)

OTHER PUBLICATIONS

Office Action issued in related application JP 2018-047076, dated Feb. 5, 2019, with machine generated English language translation, 8 pages.
(Continued)

*Primary Examiner* — Darlene P Condra
(74) *Attorney, Agent, or Firm* — Faegre Drinker Biddle & Reath LLP

(57) ABSTRACT

An attachment member allowing a connected state between the attachment member and a guide member to be more easily checked is provided. The attachment member for attaching a stay cloth, which guides a deployment direction of an airbag module, to a seat back frame has a holding portion which includes a holding space for housing an attachment portion of the stay cloth. The holding portion is inserted into an attachment hole to be fitted into the attachment hole that is formed in the seat back frame. A through-hole which allows the attachment portion of the stay cloth in the holding space to be exposed in a penetrating direction of the attachment hole is formed in the holding portion.

20 Claims, 26 Drawing Sheets

(56) References Cited

U.S. PATENT DOCUMENTS

| | | | |
|---|---|---|---|
| 7,219,400 | B2 | 5/2007 | Tashima et al. |
| 7,841,817 | B2 | 11/2010 | Kawai |
| 8,696,018 | B2 | 4/2014 | Yamamoto |
| 8,961,092 | B2 | 2/2015 | De Jong et al. |
| 9,132,789 | B2 | 9/2015 | Suzuki |
| 2002/0063452 | A1* | 5/2002 | Harada ................ B60N 2/5825 297/216.13 |
| 2003/0107202 | A1 | 6/2003 | Tajima et al. |
| 2006/0131848 | A1 | 6/2006 | Miyake et al. |
| 2007/0216139 | A1 | 9/2007 | Mazanek et al. |
| 2007/0241546 | A1 | 10/2007 | Chida et al. |
| 2009/0020988 | A1* | 1/2009 | Sato ...................... B60R 21/207 280/730.2 |
| 2009/0056087 | A1 | 3/2009 | Arisaka |
| 2010/0295272 | A1 | 11/2010 | Aoki |
| 2010/0303539 | A1 | 12/2010 | Aoki et al. |
| 2011/0025034 | A1 | 2/2011 | Lim et al. |
| 2011/0057426 | A1 | 3/2011 | Nakamura et al. |
| 2011/0062683 | A1 | 3/2011 | Schirm |
| 2012/0056054 | A1 | 3/2012 | Glockler |
| 2013/0187368 | A1 | 7/2013 | Donais et al. |
| 2013/0187416 | A1 | 7/2013 | Nakata |
| 2014/0312664 | A1 | 10/2014 | Tanabe et al. |
| 2015/0076802 | A1* | 3/2015 | Tanabe ..................... B60N 2/68 280/730.2 |
| 2015/0336528 | A1 | 11/2015 | Tanabe et al. |
| 2019/0001914 | A1* | 1/2019 | Yaegashi ............... B60R 21/207 |

FOREIGN PATENT DOCUMENTS

| | | |
|---|---|---|
| EP | 2 292 478 A1 | 3/2011 |
| JP | S53-110614 U | 9/1978 |
| JP | H08-040163 A | 2/1996 |
| JP | H09-039711 A | 2/1997 |
| JP | 2002-154361 A | 5/2002 |
| JP | 3978741 B2 | 9/2007 |
| JP | 2008-037261 A | 2/2008 |
| JP | 2008-126972 A | 6/2008 |
| JP | 4543270 B2 | 9/2010 |
| JP | 2012-218666 A | 11/2012 |
| JP | 2013-112186 A | 6/2013 |
| JP | 2013-124028 A | 6/2013 |
| JP | 2013-151237 A | 8/2013 |
| JP | 2013-189140 A | 9/2013 |
| JP | 2013-209031 A | 10/2013 |
| JP | 2014-129059 A | 7/2014 |

OTHER PUBLICATIONS

Extended European Search Report issued in related application EP 15737285.5, dated Jan. 5, 2017, 7 pages.

Office Action issued in related application CN 201580004612.0, dated Apr. 28, 2017, with machine generated English language translation, 18 pages.

Office Action issued in related application JP 2014-013661, dated Oct. 3, 2017, with machine generated English language translation, 6 pages.

Office Action issued in related application JP 2014-019633, dated Jan. 9, 2018, with machine generated English language translation, 7 pages.

Notice of Allowance issued in related U.S. Appl. No. 15/705,914, dated May 22, 2018, 9 pages.

Office Action issued in related application CN 201811057349.3, dated Sep. 14, 2020, with machine generated English anguage translation, 11 pages.

* cited by examiner

ATTACHMENT MEMBER, AND SEAT EQUIPPED WITH AIRBAG MODULE

CROSS REFERENCE TO RELATED APPLICATIONS

This application is a continuation of U.S. patent application Ser. No. 15/111,667, filed on Jul. 14, 2016, now U.S. Pat. No. 10,081,276, which is a National Stage Entry application of PCT Application No. PCT/JP2015/050978, filed Jan. 15, 2015, which claims the priority benefit of Japanese Patent Application Nos. JP2014-019633, filed Feb. 4, 2014; JP2014-013661, filed Jan. 28, 2014; and JP2014-006211, filed Jan. 16, 2014, the contents of each of which are incorporated herein by reference in their entireties.

BACKGROUND

The present disclosure relates to an attachment member and a seat equipped with airbag module, and it pertains to an attachment member for attaching a guide member for guiding a deployment direction of an airbag and a seat equipped with airbag module including the attachment member.

Conventionally, a seat in which an airbag module is attached to a side frame of a seat back frame has been proposed as a seat equipped with an airbag module. For example, ends of a trim cover (surface material) are sewn together with respective one ends of two stay cloths (which is hereinafter referred to as guide members) to form a breaking portion of the trim cover. The two stay cloths are pulled from the breaking portion into the inside of the trim cover to wrap the airbag module; thereby, a seat back including this airbag module is entirely covered by the trim cover (for example, see Japanese Patent Publication JP 2013-112186A, Japanese Patent Publication JP 4543270B, or Japanese Patent Publication JP 3978741B).

In particular, Japanese Patent Publication JP 2013-112186A ("the '186 document") discloses the technique to attach an attachment member, attached to the end of the stay cloth, to a rim of the side frame. Specifically, a groove to be connected with the end of the stay cloth and a groove to be locked to a front rim of the side frame are formed in the attachment member, and these two grooves are formed to extend in parallel with each other. According to the '186 document, the stay cloths allow an expansion pressure of the airbag to be effectively concentrated on a sewn portion that serves as the breaking portion of the trim cover and high deployment performance of the airbag can be maintained. In addition, the stay cloths can be easily attached by using the attachment member.

Further, two listing wires disclosed in Japanese Patent Publication JP 4543270B ("the '270 document") are located on the opposite side of the airbag module of the side frame to be entwined with each other to form a wire puzzle shape. The ends of the two stay cloths pulled from the breaking portion to both sides of the airbag module are extended to the two listing wires so that the stay cloths wrap the airbag module, thereafter being attached respectively to the listing wires. According to the '270 document, the airbag module is directly wrapped by the stay cloths and the stay cloths can be surely pulled and locked by the listing wires with their respective ends at which the stay cloths are provided. The expansion pressure of the airbag can be effectively concentrated by the stay cloths on the sewn portion that serves as the breaking portion of the trim cover. As a result, the high deployment performance of the airbag can be attained.

However, in the '270 document, the listing wires are provided to be entwined with each other to form a wire puzzle shape; therefore, the listing wires are configured in a complicated manner and an attaching process is complicated. In addition, the listing wires are required to attach the stay cloths to the side frame, resulting in an increase of the size of an area surrounding the side frame; therefore, a more compact structure has been desired.

Accordingly, an attachment member for holding an end of a stay cloth to a side frame without using a listing wire and to more easily fix the stay cloth so that an airbag module is wrapped by the stay cloth is disclosed by Japanese Patent Application No. 2012-288619. Specifically, a portion of the attachment member is fitted into a substantially rectangular attachment hole of the side frame to thereby fix the end of the stay cloth to the side frame. According to Japanese Patent Application No. 2012-288619, a listing wire is not used; therefore, the attachment member is more easily fitted into the attachment hole of the side frame and an increase of the size of an area surrounding the side frame is avoided.

Further, Japanese Patent Publication JP 3978741B ("the '741 document") discloses the seat equipped with airbag module in which a support bar and two wires which are configured by wire rods of piano wire rods or the like are used to attach the stay cloths to the side frame. Specifically, in order to attach the two stay cloths to the side frame, firstly, respective one ends of the two stay cloths are sewn to the surface material, and the other end of one of the two stay cloths is sewn to one of the two wires and the other end of the other of the two stay cloths is sewn to the other of the wires. Next, the wires are respectively hooked to the support bar to be entwined with the support bar that is fixed to the side frame. Furthermore, the stay cloth disclosed in the '741 document is fan-shaped in a manner to spread out fanwise from a portion sewn to the wire and is formed to cover the airbag module.

In the technique disclosed in the '186 document, a process for attaching the stay cloth to the attachment member is one process which is included in a process for attaching the trim cover to the seat back frame. Therefore, it is necessary to, before completely covering the seat back frame by the trim cover, check whether the attachment member is attached to the stay cloth in a correct procedure. As described above, in the attachment member, the groove to be locked to the front rim of the side frame and the groove to be connected with the end of the stay cloth are formed to extend in parallel with each other. In addition, the front rim of the side frame extends in an up to down direction. Accordingly, in a state where the attachment member is attached to the front rim of the side frame, the groove formed in the attachment member to be connected with the end of the stay cloth extends in the up to down direction. Therefore, in order to check a connected state between the stay cloth and the attachment member after attaching the attachment member to the side frame in a seat width direction, an operator needs to change his/her position to check by shifting a view in the seat width direction at the time of attaching the attachment member to the side frame to a view toward the upper or lower side relative to the attachment member, resulting in low workability. Further, the operation to attach the end of the stay cloth to the side frame by using the attachment member as disclosed in the '186 document is performed in a manner to attach the attachment member to the side frame by pulling the stay cloth in a state where the trim cover is rolled up by the operator. Thus, in a case where the connected state between the stay cloth and the attachment member is checked in a state where the attachment member is attached to the side frame, the trim cover needs to be rolled up. This makes the operation difficult and therefore an instant check is required. Furthermore, a clipped portion may be hidden by the trim cover; therefore, the connected state may not be easily checked.

Further, as disclosed in Japanese Patent Application No. 2012-288619, in order to avoid the stay cloth from being twisted, it is necessary to attach the attachment member by checking its position; therefore, the operation to attach the stay cloth takes time and manufacturing efficiency of the seat may deteriorate. Furthermore, in the structure disclosed in the '741 document where the two stay cloths are attached to the side frame by using the two wires, the stay cloths are sewn to the two wires, respectively, and in addition, the two wires needs to be entwined with the support bar in a state where the stay cloths are pulled. Thus, the number of components is large and workability is low.

Moreover, the stay cloth is formed to have a fan-shape. Therefore, an expansion pressure when the airbag is operated is widely applied to the sewn portion on which the fanwise spread portions of the stay cloths sewn to each other are sewn together with the surface material. Consequently, in an area of the sewn portion in the up to down direction of the seat, it is difficult to control the deployment of the airbag in such a way that the sewn portion breaks at different timing.

SUMMARY

The present disclosure is made in view of the aforementioned problems, and at least some of the embodiments described herein provide an attachment member which allows a connected state between the attachment member and a guide member to be more easily checked. Further, some embodiments described herein provide an attachment member which allows the guide member to be more easily attached and to provide a seat equipped with airbag module which prevents a wrong assembly of the attachment member and has high manufacturing efficiency. Furthermore, an embodiment of the present disclosure provides a seat equipped with airbag module in which the guide member for guiding the deployment direction of an airbag can be more easily attached to a frame member and in which loads in different positions or in different directions can be transmitted from the guide member to a surface material.

The aforementioned problems can be solved by an embodiment of an attachment member for attaching a guide member, which guides a deployment direction of an airbag module, to a frame member, the attachment member including a main body which has a housing portion for housing an end side of the guide member and which is inserted into an attachment hole to be fitted into the attachment hole that is formed in the frame member, wherein a check window is formed in the main body, the check window allowing the end side of the guide member in the housing portion to be exposed in a penetrating direction of the attachment hole in a state where the guide member is attached to the frame member.

According to the above-described structure, the check window that allows the end side of the guide member housed in the housing portion of the main body to be exposed in the penetrating direction of the attachment hole is formed in the main body. Therefore, the attachment member which allows a connected state between the attachment member and the guide member to be more easily checked without shifting a vision after an operation to insert the main body can be provided.

Further, in an embodiment, a plate-shaped flange portion which is in contact with the frame member is formed at the main body, such that the check window is a through-hole which penetrates through the flange portion, and that the main body includes a bridging portion that bridges over the through-hole. According to the above-described structure, the main body includes the flange portion and the bridging portion that is bridged between the through-holes formed in the flange portion. Therefore, the attachment member is stably attached to the frame member by the flange portion, and a reduction of rigidity due to the through-holes can be inhibited by the bridging portion that is bridged between the through-holes. In addition, the end side of the guide member can be prevented from loosening from the through-holes.

Furthermore, in an embodiment, a fixing member which is locked into the housing portion is fixed to the end side of the guide member and at least one of the guide member, the main body, and the fixing member has a different color from colors of the others. According to the above-described structure, the fixing member is locked; thereby, the end side of the guide member can be stably housed in the housing portion, and in addition, at least one of the guide member, the main body, and the fixing member can be more easily identified by the difference in color and whether an assembled state of each component is normal can be more easily checked.

Moreover, in an embodiment, the guide member has a different color from a color of the main body. According to the above-described structure, a connected state between the guide member and the main body can be more easily checked by the difference in color.

In addition, in an embodiment, the fixing member, the guide member, and the main body all have different colors. According to the above-described structure, the components can be individually identified and therefore their connected states are more properly checked.

Further, in an embodiment, an anti-loosening portion which prevents the fixing member from loosening from the housing portion is formed in the main body and the anti-loosening portion is formed in a position to face the check window. According to the above-described structure, the anti-loosening portion which prevents the fixing member from loosening from the housing portion is formed in the main body, and in addition, the check window is formed in positions to face the anti-loosening portion. Therefore, the fixing member is stably housed by the anti-loosening portion and the connected state of the guide member can be surely checked from the check window.

Furthermore, in an embodiment, an opposite-side check window is formed in the main body to be located on the opposite side of the housing portion from the check window and to be opened to allow the end side of the guide member to be exposed. According to the above-described structure, the main body includes the check window and the opposite-side check window; thereby, the connected state can be checked from two sides of the check window and the opposite-side check window and it becomes much easier to do the checking operation.

Moreover, in an embodiment, an opposite-side check window is formed in the main body to be located on the opposite side of the housing portion from the check window and to be opened to allow the end side of the guide member to be exposed, and the opposite-side check window is a cut-out portion which is formed in the anti-loosening portion. According to the above-described structure, the opposite-side check window is configured by the cut-out portion formed in the anti-loosening portion. Therefore, the end side of the guide member is prevented from loosening by the anti-loosening portion, and in addition, the connected state of the end side of the guide member can be checked from the opposite side of the check window.

In addition, in an embodiment, the housing portion is formed to be elongated and a length of the anti-loosening portion in an elongation direction of the housing portion is larger than a length of the cut-out portion in the elongation direction of the housing portion. According to the above-described structure, the anti-loosening portion is configured to be longer in the elongation direction of the housing portion than the length of the cut-out portion in the elongation direction of the housing portion. Therefore, a function to check the connected state is secured, and in addition, the capability of prevention against loosening of the end side of the guide member can be improved.

Further, the attachment hole is formed in a side frame of a seat equipped with airbag module, and a wrong assembly preventing portion which prevents the attachment member from being wrongly attached to the attachment hole is provided. The wrong assembly preventing portion may be formed at least at a portion which faces an inner surface of the attachment hole. According to the above-described structure, in a case where the attachment member may be attached to the attachment hole to be wrongly oriented, a portion of the attachment member, which faces the inner surface of the attachment hole interferes with the inner surface of the attachment hole and the attachment member is not fitted into the attachment hole. Therefore, a wrong assembly is prevented in advance. Consequently, the attachment member does not need to be re-assembled. As a result, the attachment member that is more easily attached to the attachment hole and that can increase manufacturing efficiency of the seat can be provided.

Furthermore, in an embodiment, the main body includes a pawl portion which is locked to the side frame and a plurality of chamfered facing corner portions which are to face a plurality of chamfered corner portions formed at the attachment hole, the main body has a slit which is formed to be communicated from an outer surface of the main body to the housing portion, one facing corner portion of the plurality of chamfered facing corner portions is formed to have a radius of curvature which is larger than a radius of curvature of the other facing corner portion, and the one facing corner portion is formed on the opposite of one side of the main body where the pawl portion and the slit are formed. According to the above-described structure, the facing corner portion is formed to have the large radius of curvature and is located at the opposite side of the one side where the pawl portion to be locked to the side frame and the slit are formed. Therefore, in a state where the attachment member is locked to the side frame by the pawl portion, stress concentration on the side opposite to the pawl portion in the attachment member can be avoided.

Moreover, in an embodiment, the main body includes an extended portion which is extended to the opposite side from the one side and the extended portion is configured so that a portion at the one side is smaller than a portion at the opposite side. According to the above-described structure, in the attachment member pivoting about a portion thereof which is attached to the side frame by the pawl portion located at the one side, the extended portion is configured so that a portion at the one side is smaller than a portion at the opposite side. Therefore, a contact area of the extended portion at the one side with the side frame can be reduced and the one side of the attachment member can be more easily deformed.

In addition, a seat equipped with an airbag module which retracts an airbag includes: the attachment member; the side frame that extends along a side portion of the seat equipped with airbag module; the airbag module that is attached to the side frame; and the guide member for guiding the deployment direction of the airbag module, and the wrong assembly preventing portion may be formed at least at a portion where the inner surface of the attachment hole and the attachment member face each other. According to the above-described structure, in a case where the attachment member may be attached to the attachment hole to be wrongly oriented, a portion of the attachment member, which faces the inner surface of the attachment hole interferes with the inner surface of the attachment hole and the attachment member is not fitted into the attachment hole. Therefore, a wrong assembly is prevented in advance. Consequently, the attachment member does not need to be re-assembled without checking position of the attachment member. As a result, the seat equipped with airbag module in which the attachment member can be more easily attached to the attachment hole and which has high manufacturing efficiency of the seat can be provided.

Further, in an embodiment, the attachment hole is shaped to include a plurality of chamfered corner portions, and the wrong assembly preventing portion is configured so that at least one corner portion of the plurality of chamfered corner portions has a radius of curvature which is different from a radius of curvature of the other corner portion. According to the above-described structure, one corner portion of the plurality of corner portions can be formed by setting suitable dimensions of forming molds or by an easy processing to have a radius of curvature which is different from a radius of curvature of the other corner portion and a wrong assembly can be inhibited at low cost.

Furthermore, in an embodiment, the one corner portion and the other corner portion are arranged in a front to back direction of the seat. According to the above-described structure, in the attachment hole of the side frame, the one corner portion and the other corner portion that have the different radii of curvature are arranged in the front to back direction. Therefore, in a case where the airbags are attached to different side frames at right and left sides, for example, to a side frame of a passenger seat and a side frame of a driver seat, the attachment members are attached to the side frames in a manner to be orientated reversely in the up to down direction. Thus, the attachment member can be used in common.

Moreover, in an embodiment, the radius of curvature of the one corner portion that is arranged at the front side is larger than the radius of curvature of the other corner portion. According to the above-described structure, on the inner surface of the attachment hole of the side frame, the corner portion at the front side has the large radius of curvature. Therefore, stress concentration at the front side on the inner surface of the attachment hole is reduced. Consequently, supporting rigidity can be appropriately attained and attachment stability can be increased. That is, in a case where the guide member is pulled at the time of expansion of the airbag, a load can be appropriately supported by the corner portion at the front side on the inner surface of the attachment hole where stress concentration is reduced.

Further, in an embodiment, the attachment hole includes a plurality of attachment holes arranged in an up to down direction of the side frame and the plurality of attachment holes has the same shape. According to the above-described structure, the attachment members to be attached to the plurality of attachment holes arranged in the up to down direction can be used in common.

Furthermore, the seat includes a cushion pad arranged on the frame member and a surface material covering the frame member and the cushion pad, and the guide member is separated from the main body into two portions to be attached to the surface material. According to the above-described structure, the guide member is separated from the main body into two portions to be attached to the surface material. Therefore, the seat equipped with airbag module can be provided in which loads in different positions or in different directions can be transmitted to the surface material by the guide member extending from the attachment member in two directions.

According to an embodiment of the present disclosure, the attachment member which allows a connected state between the attachment member and the guide member to be more easily checked without shifting a vision after an operation to insert the main body can be provided.

Further, according to an embodiment of the present disclosure, the attachment member is stably attached to the frame member by the flange portion, and a reduction of rigidity due to the through-holes can be inhibited by the bridging portion that is bridged between the through-holes. In addition, the end side of the guide member can be prevented from loosening from the through-holes.

Furthermore, according to an embodiment of the present disclosure, at least one of the guide member, the main body, and the fixing member can be more easily identified and whether an assembled state of each component is normal can be more easily checked.

Still further, according to an embodiment of the present disclosure, a connected state between the guide member and the main body can be more easily checked.

Moreover, according to an embodiment of the present disclosure, connected states of components are more properly checked.

In addition, according to an embodiment of the present disclosure, the end side of the guide member is stably housed in the predetermined housing portion by the anti-loosening portion and the connected state of the guide member can be surely checked from the check window.

Further, according to an embodiment of the present disclosure, the connected state can be checked from two sides of the check window and the opposite-side check window and it becomes much easier to do the checking operation.

Furthermore, according to an embodiment of the present disclosure, the end side of the guide member is prevented from loosening by the anti-loosening portion, and in addition, the connected state of the end side of the guide member can be checked from the opposite side of the check window.

Still further, according to an embodiment of the present disclosure, a function to check the connected state is secured, and in addition, the capability of prevention against loosening of the end side of the guide member can be improved.

Moreover, according to an embodiment of the present disclosure, the attachment member that is more easily attached to the attachment hole and that can increase manufacturing efficiency of the seat can be provided.

Further, according to an embodiment of the present disclosure, in a state where the attachment member is locked to the side frame by the pawl portion, stress concentration on the side opposite to the pawl portion in the attachment member can be reduced.

Furthermore, according to an embodiment of the present disclosure, a contact area of the extended portion at the one side with the side frame can be reduced and the one side of the attachment member can be more easily deformed.

According to an embodiment of the present disclosure, the seat equipped with airbag module in which the attachment member can be more easily attached to the attachment hole and which has high manufacturing efficiency of the seat can be provided.

Further, according to an embodiment of the present disclosure, one corner portion of the plurality of corner portions can be formed by setting suitable dimensions of forming molds or by an easy processing to have a radius of curvature which is different from a radius of curvature of the other corner portion and a wrong assembly can be inhibited at low cost.

Furthermore, according to an embodiment of the present disclosure, the attachment members are attached in a manner to be orientated reversely in the up to down direction, thereby being used in common.

Still further, according to an embodiment of the present disclosure, stress concentration at the front side on the inner surface of the attachment hole is reduced; thereby, supporting rigidity can be appropriately attained and attachment stability can be increased.

Moreover, according to an embodiment of the present disclosure, the attachment members to be attached to the plurality of attachment holes arranged in the up to down direction can be used in common.

According to an embodiment of the present disclosure, the seat equipped with airbag module can be provided in which loads in different positions or in different directions can be transmitted to the surface material by the guide member extending from the attachment member in two directions.

BRIEF DESCRIPTION OF DRAWINGS

Various embodiments of the present disclosure are illustrated in the drawings, in which.

DETAILED DESCRIPTION

Herein, an attachment member for attaching a guide member according to embodiments of the present disclosure to a side frame is described. In addition, the embodiments described below are merely examples to facilitate understanding of the present disclosure, and it is understood that the present disclosure may be changed and modified without departing from the spirit of the invention and that the present disclosure may include its equivalents.

First Embodiment

Figure 1:
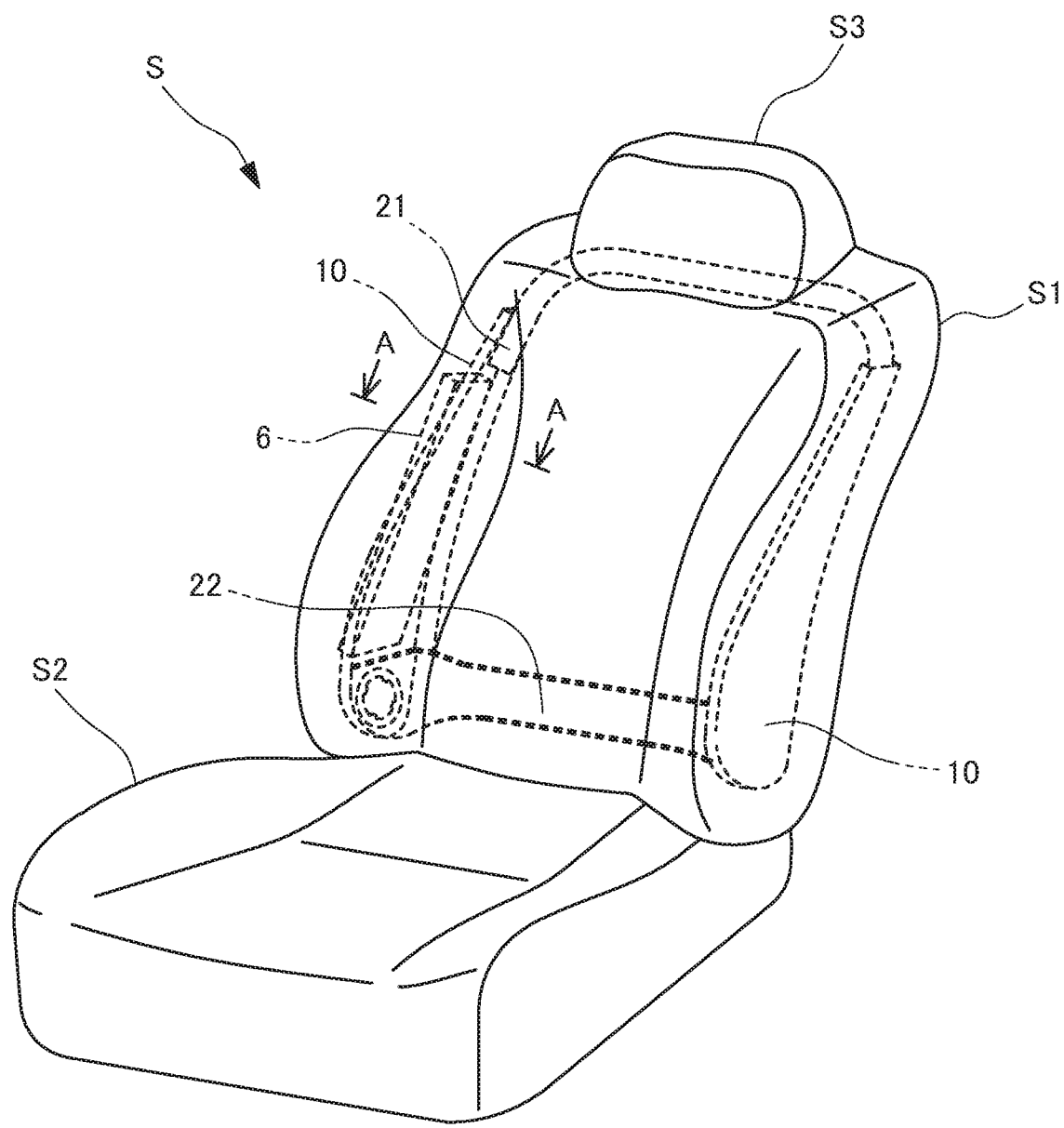
FIG. 1 is an outline view of a seat equipped with an airbag module according to an embodiment of the present disclosure.
Figure 2:
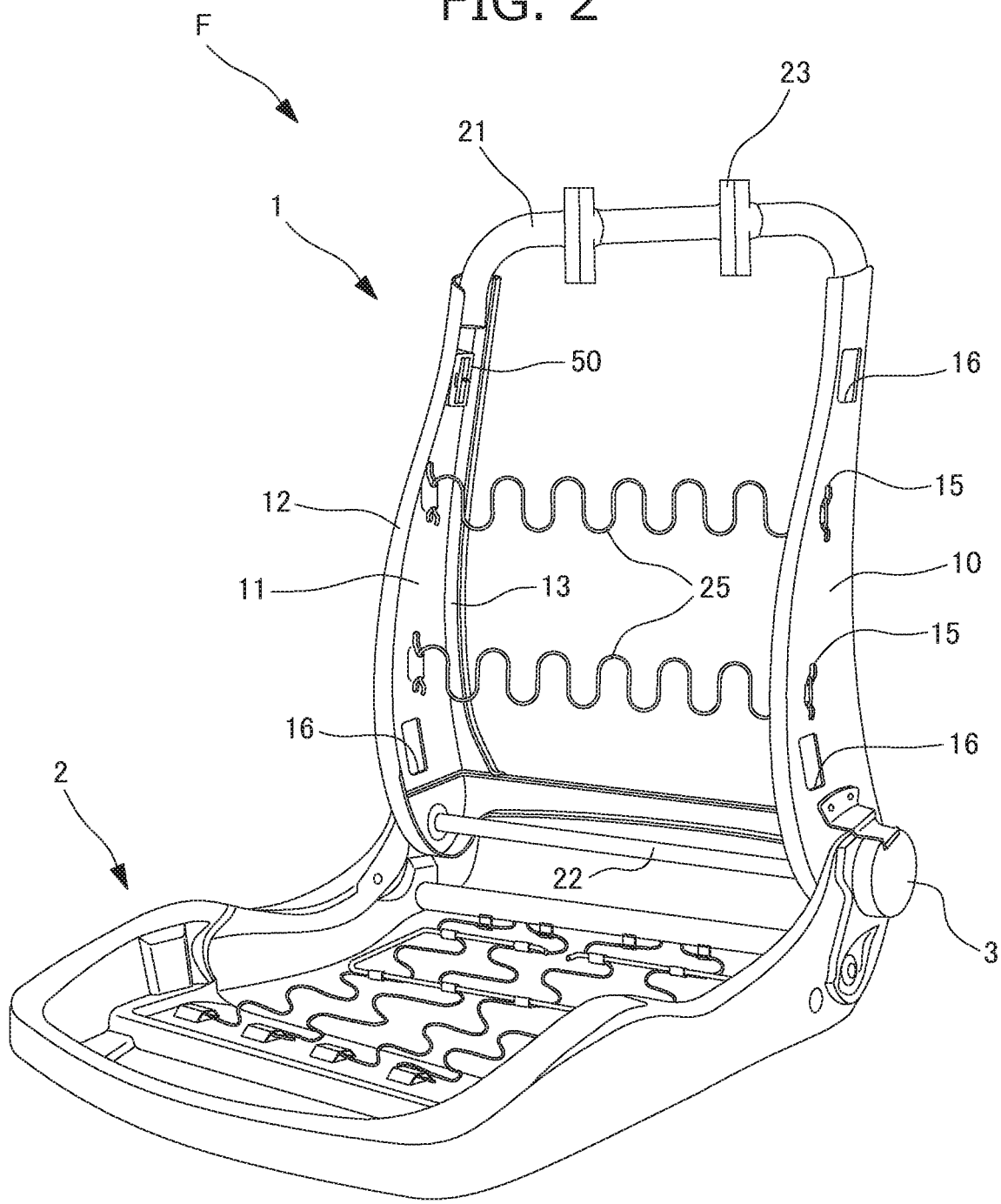
FIG. 2 is a perspective view of a seat frame of the seat equipped with airbag module according to a first embodiment of the present disclosure.
Figure 3:
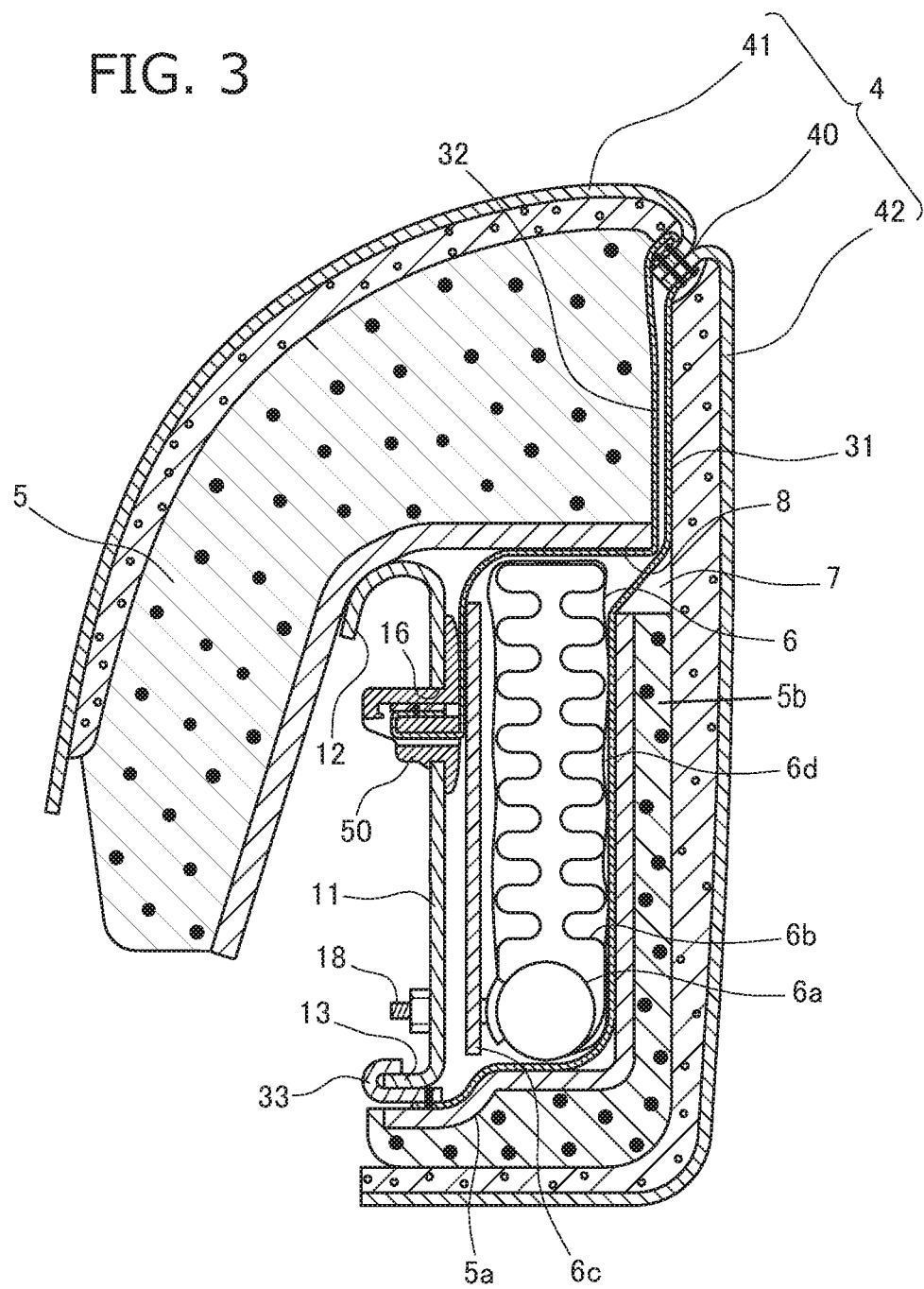
FIG. 3 is a partial, cross-sectional view taken along the line A-A of FIG. 1 and is an explanatory drawing showing a state where a stay cloth is connected to a side frame via an attachment member according to the first embodiment of the present disclosure.
Figure 4:
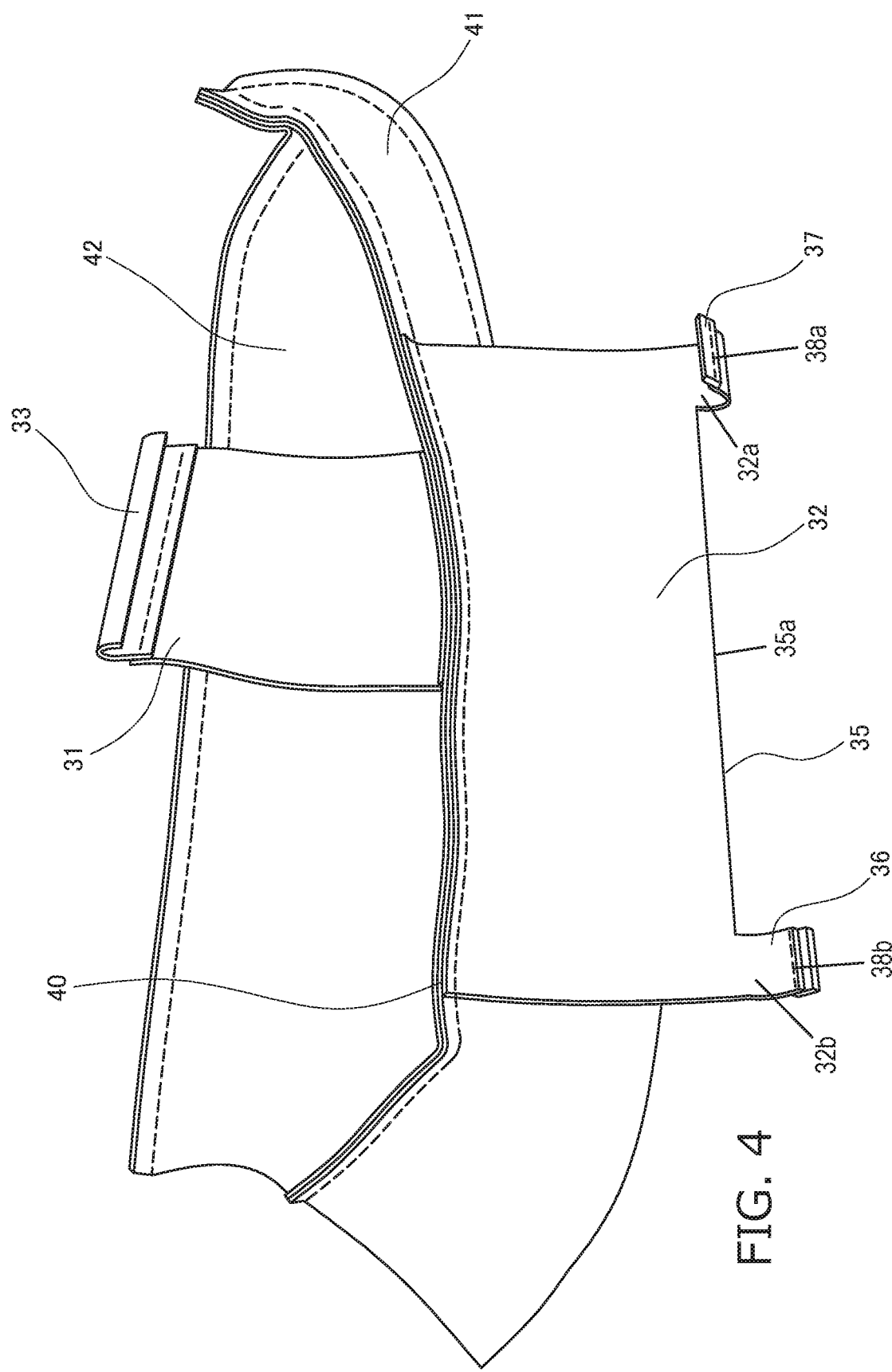
FIG. 4 is an explanatory drawing showing a state where a trim cover according to the first embodiment of the present disclosure and the stay cloths are sewn together on a breaking portion.
Figure 5:
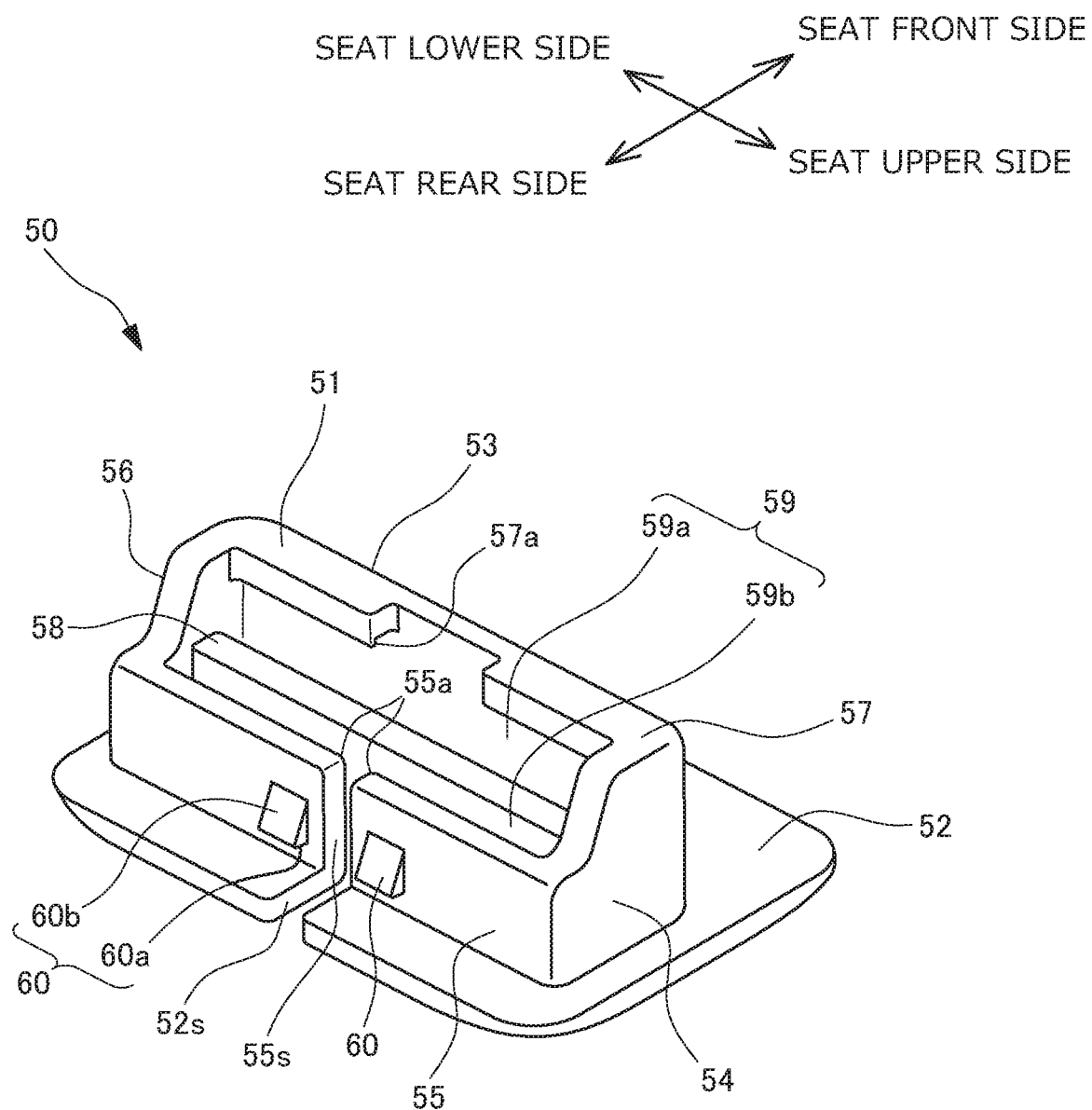
FIG. 5 is a perspective view of the attachment member according to the first embodiment of the present disclosure.
Figure 6:
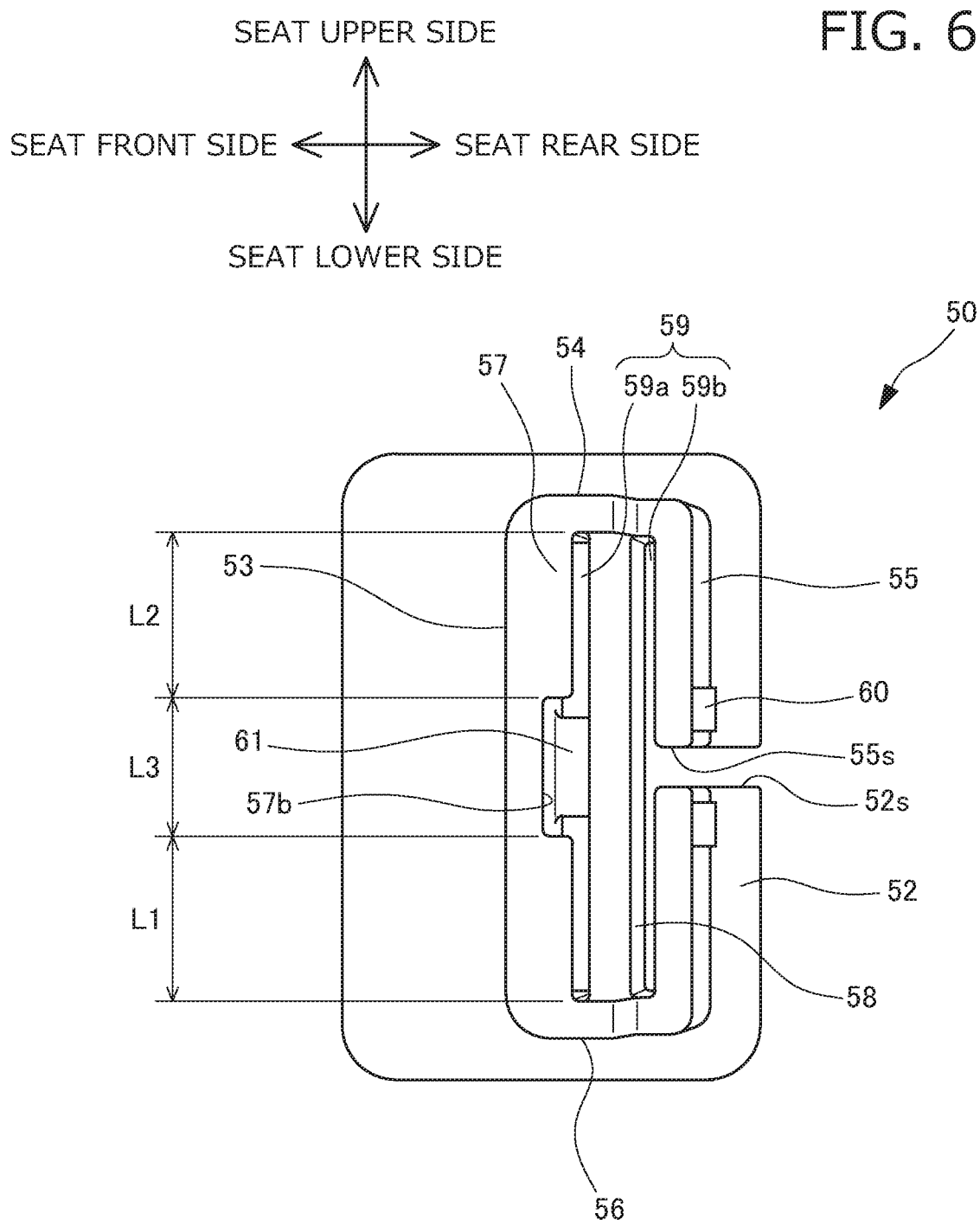
FIG. 6 is a plan view of the attachment member according to the first embodiment of the present disclosure.
Figure 7:
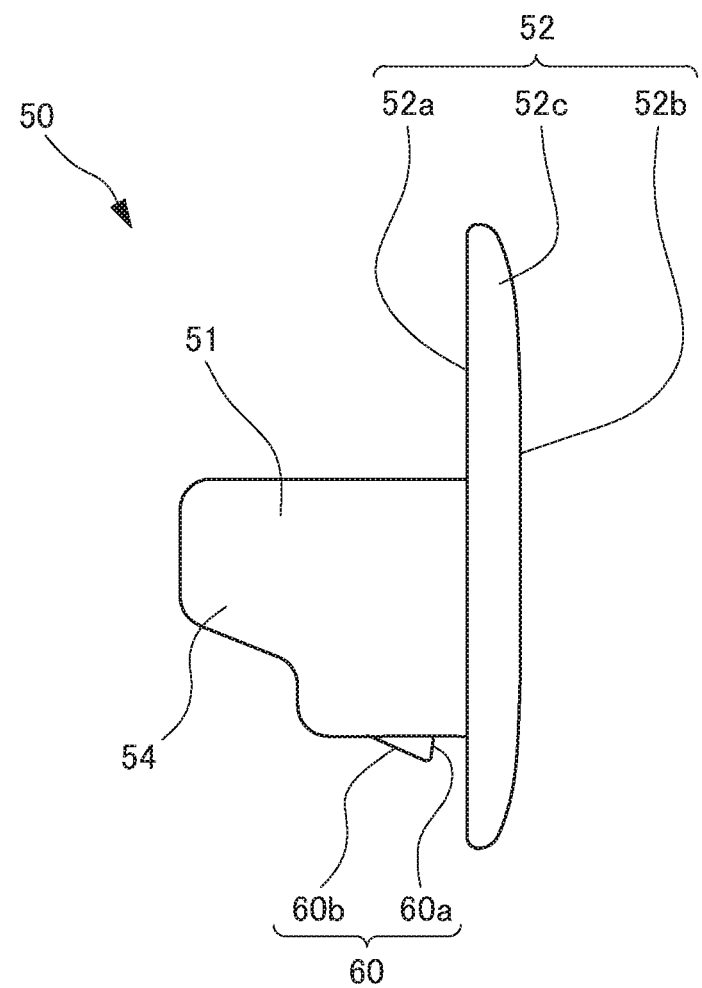
FIG. 7 is a side view of the attachment member according to the first embodiment of the present disclosure.
Figure 8:
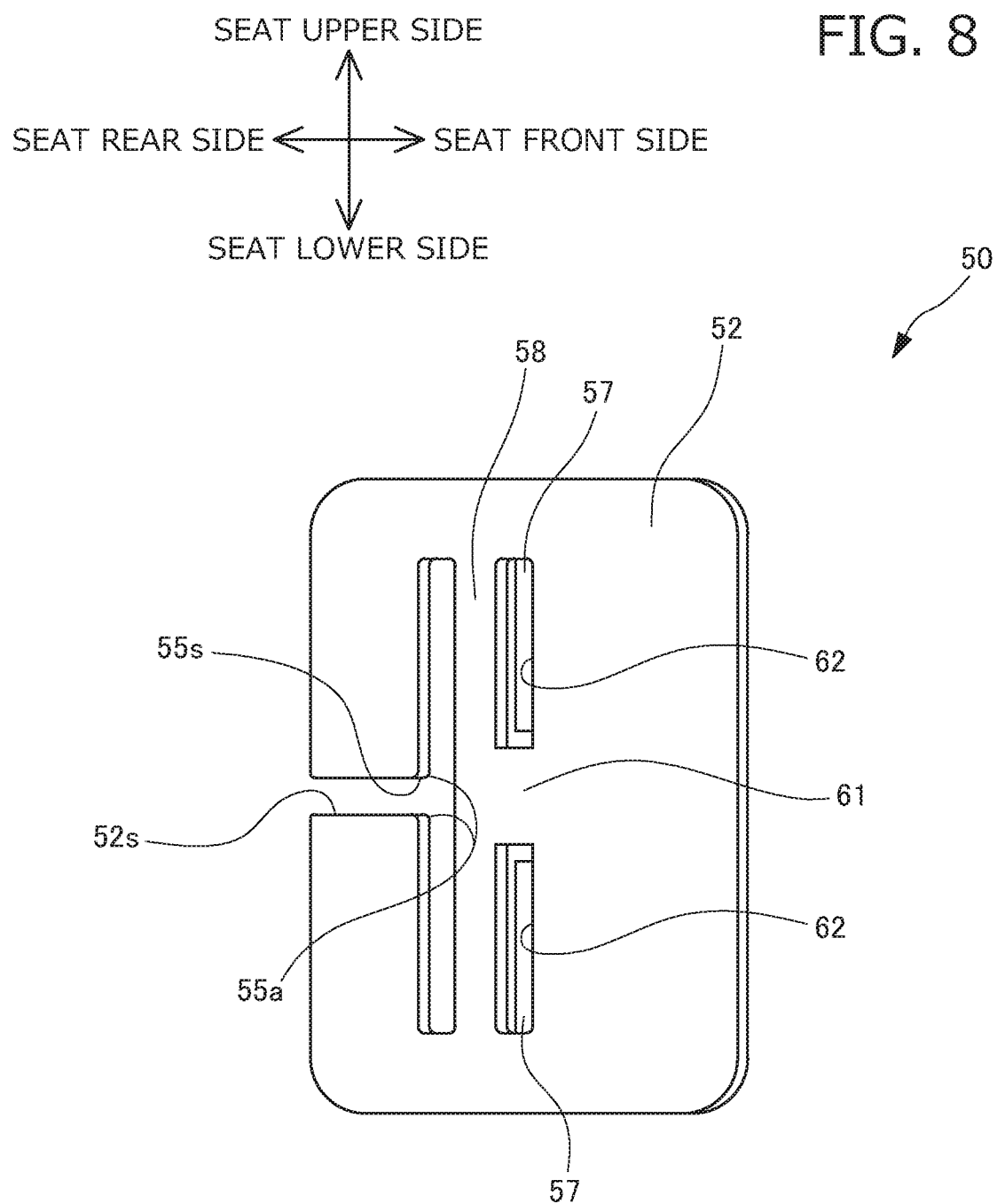
FIG. 8 is a bottom view of the attachment member according to the first embodiment of the present disclosure.
Figure 9:
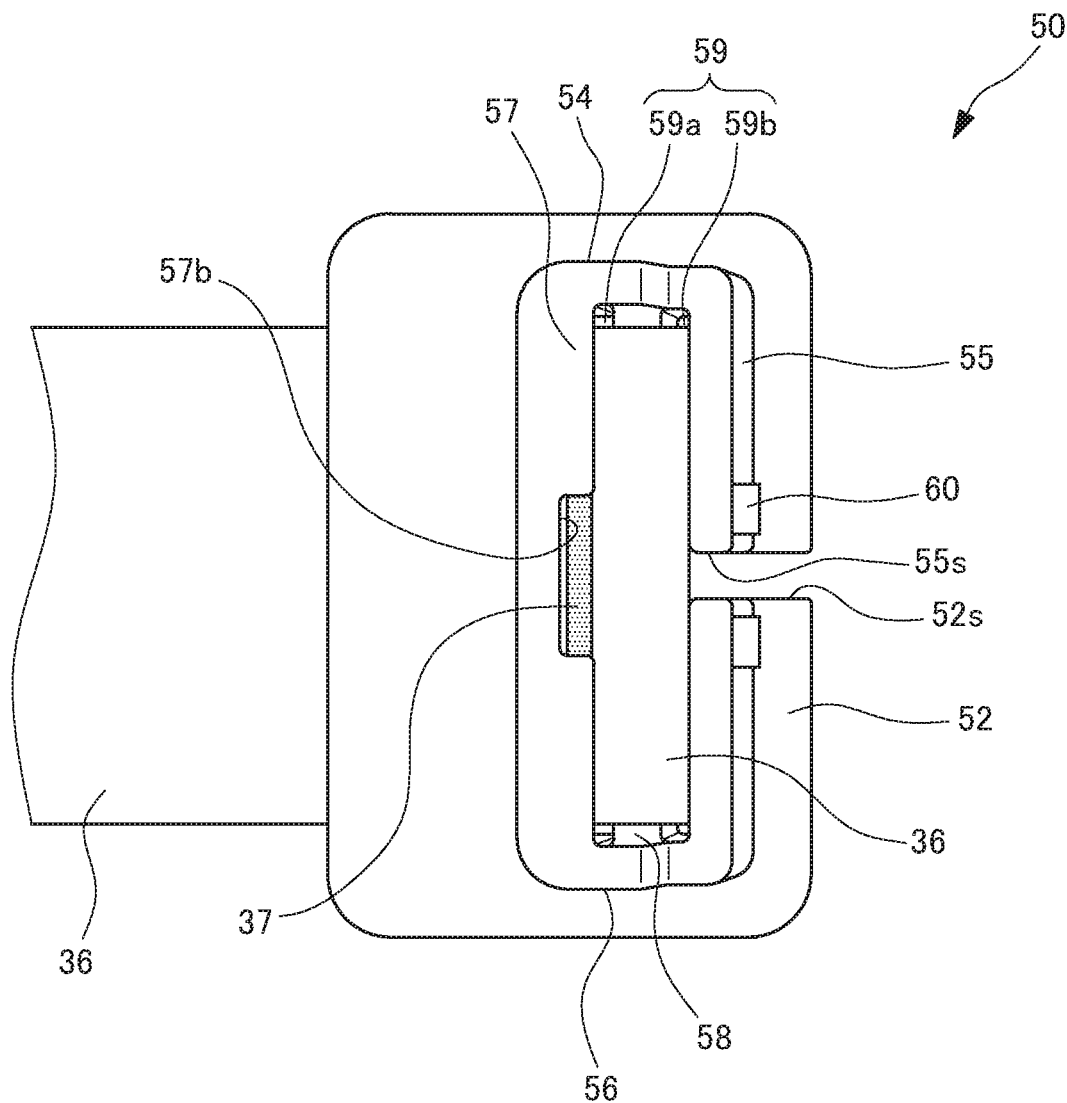
FIG. 9 is a plan view showing a state where an attachment portion of the stay cloth is held by the attachment member according to the first embodiment of the present disclosure.
Figure 10:
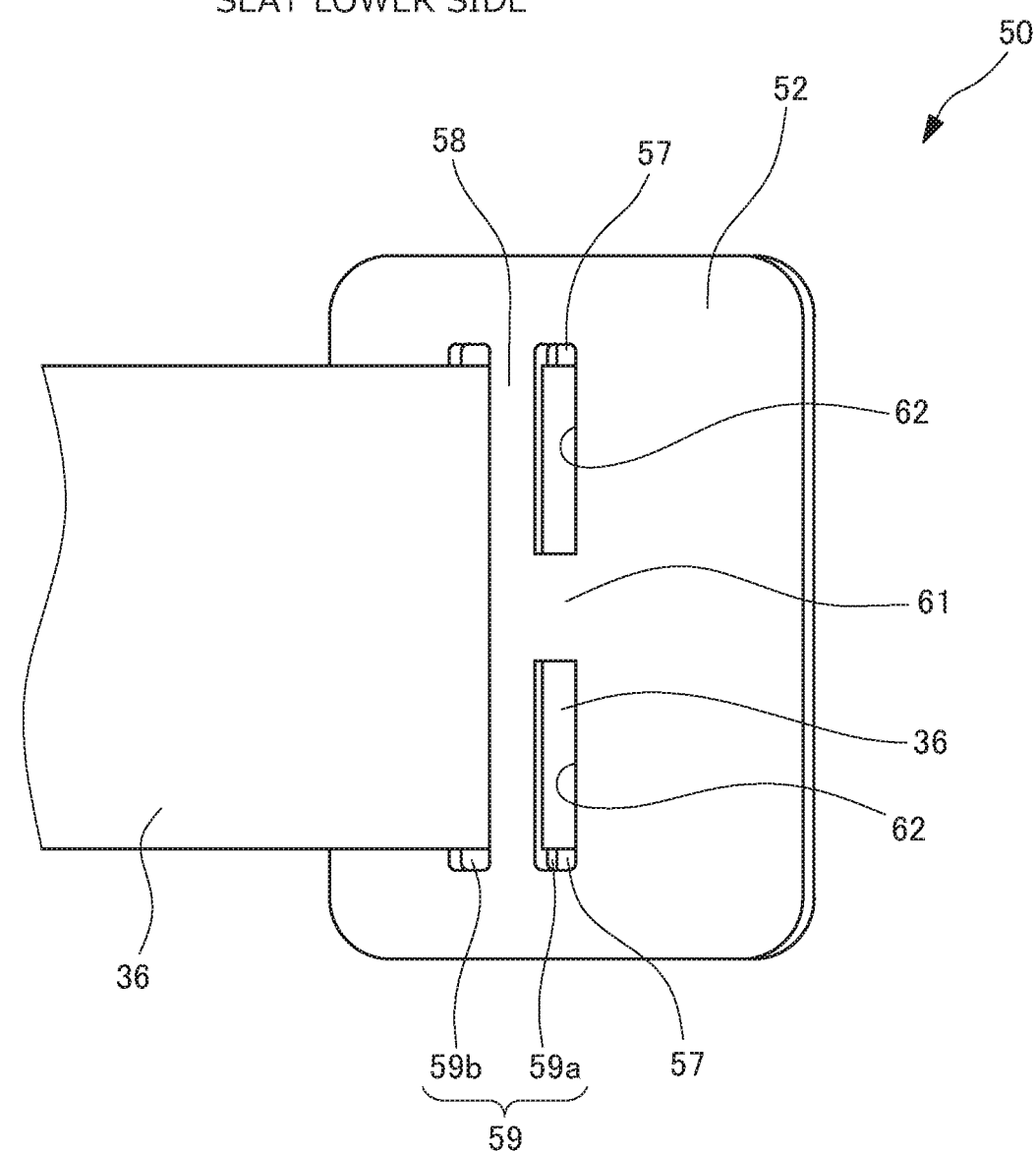
FIG. 10 is a bottom view showing a state where the attachment portion of the stay cloth is held by the attachment member according to the first embodiment of the present disclosure.
Figure 11:
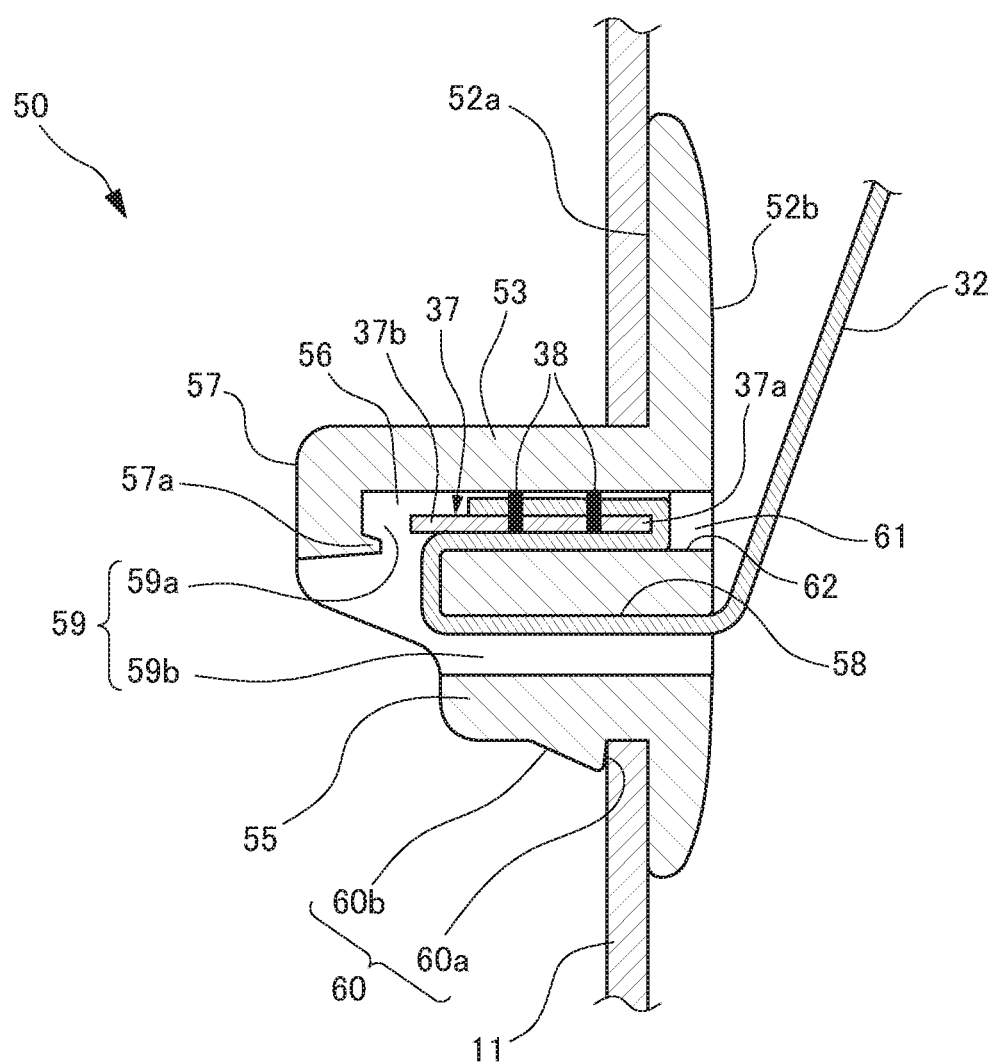
FIG. 11 is a cross-sectional explanatory drawing showing a state where the stay cloth is connected to the side frame via the attachment member according to the first embodiment of the present disclosure.

First, the attachment member according to a first embodiment of the present disclosure is described with reference to FIG. 1 to FIG. 11. FIG. 1 is an outline view of a seat equipped with airbag module according to the embodiment of the present disclosure. FIG. 2 is a perspective view of a seat frame of the seat equipped with airbag module according to the first embodiment of the present disclosure. FIG. 3 is a partial, cross-sectional view taken along the line A-A of FIG. 1 and is an explanatory drawing showing a state where a stay cloth is connected to the side frame via the attachment member according to the first embodiment of the present disclosure. FIG. 4 is an explanatory drawing showing a state where a trim cover according to the first embodiment of the present disclosure and the stay cloths are sewn together on a breaking portion. FIG. 5 is a perspective view of the attachment member according to the first embodiment of the present disclosure. FIG. 6 is a plan view of the attachment member according to the first embodiment of the present disclosure. FIG. 7 is a side view of the attachment member according to the first embodiment of the present disclosure. FIG. 8 is a bottom view of the attachment member according to the first embodiment of the present disclosure. FIG. 9 is a plan view showing a state where an attachment portion of the stay cloth is held by the attachment member according to the first embodiment of the present disclosure. FIG. 10 is a bottom view showing a state where the attachment portion of the stay cloth is held by the attachment member according to the first embodiment of the present disclosure. FIG. 11 is a cross-sectional explanatory drawing showing a state where the stay cloth is connected to the side frame via the attachment member according to the first embodiment of the present disclosure. Here, in the description below, a front to back direction of the seat corresponds to a front to back direction viewed from an occupant seated at the seat and is hereinafter also simply referred to as a front to back direction. Further, an up to down direction corresponds to an up to down direction of the seat.

As shown in FIG. 1, a vehicle seat S serving as the seat equipped with an airbag module according to the present embodiment comprises a seat back S1, a seating portion S2, and a headrest S3. A seat frame F as shown in FIG. 2 is provided in the vehicle seat S. The seat frame F comprises a seat back frame 1 serving as a frame of the seat back S1 and by a seating frame 2 serving as a frame of the seating portion S2. The seating frame 2 and the seat back frame 1 are connected via a reclining mechanism 3. A cushion and a trim cover are provided at the outer side of the seat back frame 1 and the seating frame 2, thereby configuring the seat back S1 and the seating portion S2.

As shown in FIG. 1 to FIG. 3, the seat back S1 mainly includes: the seat back frame 1; cushion pads 5, 5a which are mounted on the seat back frame 1; a trim cover 4 which covers the seat back frame 1 and the cushion pads 5, 5a; and stay cloths 31, 32, one end each of which is sewn to a breaking portion 40 of the trim cover 4.

As shown in FIG. 1 and FIG. 2, the seat back frame 1 is formed into a frame shape by side frames 10 which are arranged to be separated at right and left sides in a seat width direction and to extend in the up to down direction, an upper frame 21 which connects upper ends of these side frames 10, and a lower frame 22 which connects lower ends of the side frames 10. Here, the seat back frame 1 corresponds to a frame member. Right and left side portions of the seat back frame 1 in the seat width direction where the side frames 10 are arranged correspond to side portions. Pillar supporting portions 23 are provided at the upper frame 21, and a headrest frame (not shown) is provided at the pillar supporting portions 23. A cushion material is provided at the outer side of the headrest frame, thereby forming the headrest S3.

A sheet metal is pressed to form the side frame 10, and the side frame 10 is formed of a substantially plate-shaped body which is curved so that a lower portion is wider than an upper portion. As shown in FIG. 3, the side frame 10 includes a substantially flat plate-shaped side plate 11, a front rim 12 which is formed by folding a front end of the side plate 11 inward into a U-shape, and a rear rim 13 which is formed by bending and curving a rear end of the side plate 11 inward into an L-shape. Locking portions 15, provided with locking holes to which ends of each of bridging members 25 formed of S springs for supporting an occupant from behind and serving as a pair of occupant supporting members are respectively locked, and a pair of attachment holes 16, each for attaching an attachment member 50, are provided in the side frame 10.

The attachment hole 16 is a substantially rectangular hole which is elongated in the up to down direction, and it is provided in the side plate 11 to be located adjacent to the front rim 12 while extending along the inclination of the front rim 12. The attachment hole 16 is formed in a position at the side frame 10, which is different from the position of a shaft portion of a bolt 18 for attaching an airbag module 6. The application of the attachment member 50 avoids the necessity of supporting the stay cloth 32 by the shaft portion of the bolt 18 and the necessity of directly perforating the stay cloth 32 itself; therefore, durability of a connected portion between the stay cloth 32 and the side frame 10 can be enhanced. Further, the position in which the airbag module 6 is attached to the side frame 10 by the bolt 18 is different from the position in which the stay cloth 32 is connected to the side frame 10 by the attachment member 50; therefore, the attachment structure can be simplified, and in addition, attaching of the airbag module 6 to the side frame 10 is not affected by the connection structure of the stay cloth 32 to the side frame 10. In addition, in the present embodiment, the attachment hole 16 for attaching the inner-side stay cloth 32 is provided only in the position adjacent to the front rim 12 of the side frame 10. In a case where both the inner-side stay cloth 32 and the outer-side stay cloth 31 are attached to the side frame 10 by using the attachment member 50, the attachment hole 16 for attaching the outer-side stay cloth 31 may be additionally provided in a position adjacent to the rear rim 13.

A pair of attachment holes 16 is provided so that the attachment holes 16 are positioned close to upper and lower ends, respectively, of the side plate 11, and the attachment holes 16 are formed above and below the locking portions 15, respectively, so that the locking portions 15 of the bridging members 25 are arranged between the attachment holes 16. Thus, the attachment hole 16 is arranged not to be horizontal with respect to the locking portion 15 and is formed in a position different from the position of the locking portion 15 in the up to down direction. With the structure just described, workability to attach the bridging member 25 and the attachment member 50 can be increased, and in addition, a reduction of rigidity of the side frame 10 in the attachment portion of the bridging member 25 or the attachment member 50 can be prevented. A front-to-rear small width portion of the side frame 10, the width of which is smaller than the width of a front-to-rear large width portion at the lower side of the side frame 10, has rigidity lower than rigidity of the front-to-rear large width portion; however, the upper frame 21 is attached to be located adjacent to the attachment hole 16 at the upper side. Therefore, the rigidity of the front-to-rear small width portion is compensated. As shown in FIG. 3, the airbag module 6 is fixed to an outer surface of the side frame 10 in the seat width direction.

The airbag module 6 of the present embodiment comprises a case-less airbag module which does not include a module case. As shown in FIG. 3, the airbag module 6 has an inflator 6a, a folded airbag 6b, a retainer 6c which holds the inflator 6a, and a wrapping material 6d which wraps the airbag 6b. An outer peripheral portion of the inflator 6a is fixed to the retainer 6c and the side frame 10 by the bolt 18 that is provided in a standing manner to extend toward the inner side of the vehicle seat S. In addition, the inflator 6a may be fixed to the side frame 10 by an inflator attaching member other than a bolt.

The inflator 6a is arranged within the airbag 6b, and the airbag 6b is configured to be deployed toward the front side of the vehicle seat S by gas discharged from the inflator 6a. The airbag 6b is held in a folded state by the wrapping material 6d formed of a fabric bag or the like. This wrapping material 6d is configured to more easily break when the airbag 6b is deployed. In addition, in the present embodiment, the airbag module 6 comprises a case-less airbag module but not limited thereto, and it may be configured to include a module case. As shown in FIG. 3, an opening 8 for retracting the airbag module 6 is formed in the cushion pad 5, and a space 7 is formed by this opening 8.

The trim cover 4 is formed of a publicly known material. As shown in FIG. 3 and FIG. 4, a front gusset portion 41 which covers from the center of a seat surface to banked faces on the right and left and a side gusset portion 42 which extends from a peripheral side surface to a back surface are sewn to each other, and a rear gusset portion (not shown) is further sewn to an end of the side gusset portion 42, which is located on the opposite side of the front gusset portion 41; thereby, the trim cover 4 is sewn into a pouched shape. The breaking portion 40 is formed on a bulging apex on a banked portion defined between the front gusset portion 41 and the side gusset portion 42. Ends of the front gusset portion 41 and the side gusset portion 42 are sewn to each other so that the breaking portion 40 can keep the strength endurable against normal use and break by a tensile force generated by an expansion of the airbag while.

As shown in FIG. 4, the stay cloths 31, 32 are sewn together on the breaking portion 40. The stay cloth 32 formed of a fabric material with low stretching properties functions to transmit stress generated by the expansion of the airbag to the breaking portion 40. The stay cloths 31, 32 each corresponding to a guide member are members which guide a deployment direction of the airbag module 6.

As shown in FIG. 4, the stay cloth 32 is formed by a substantially rectangular fabric. Plural attachment portions 36 for attaching trim plates 37, each protruded into a rectangular shape, are respectively provided at both ends of a side 35 facing the breaking portion 40. The trim plate 37 is a rectangular plate body made of a rigid resin. The trim plate 37 is used to maintain the shape of an end of the attachment portion 36 of the stay cloth 32. The trim plate 37 is fixed to the end of the stay cloth 32; therefore, workability in inserting the end of the stay cloth 32 into a holding space 59 is increased. Here, the trim plate 37 corresponds to a fixing member. The holding space 59 functions to house the trim plate 37 sewn to the end of the stay cloth 32 and corresponds to a housing portion.

Further, in the present embodiment, the trim plate 37 is fixed to the attachment portion 36 of the stay cloth 32, but other embodiments are not limited thereto. Alternatively, without using the trim plate 37, a portion obtained such that the end of the attachment portion 36 of the stay cloth 32 is folded multiple times to be sewn, such that the end of the attachment portion 36 is rolled up multiple times to be sewn, or such that the end of the attachment portion 36 is rolled up to be sewn and subsequently squashed in one direction may be inserted into the holding space 59 of the attachment member 50.

As shown in FIG. 3, the stay cloth 32 is pulled from the breaking portion 40 into the space 7. The trim plate 37 fixed to the attachment portion 36 of the stay cloth 32 is locked via the attachment member 50 to the attachment hole 16 of the side frame 10. Further, as shown in FIG. 3, a locking hook 33 is sewn to the other end of the stay cloth 31 to be fixed thereto. The stay cloth 31 is pulled into a space defined between a cushion pad 5a, which is arranged at the rear side of the airbag module 6, and the airbag module 6, and the locking hook 33 is locked to the rear rim 13 of the side frame 10. Furthermore, in a case where the attachment member 50 is applied also for attaching the outer-side stay cloth 31, the trim plate 37 is sewn to the end of the stay cloth 31 to be fixed thereto. In addition, the attachment hole 16 is provided adjacent to the rear rim 13 of the side frame 10; and likewise for the case of the inner-side stay cloth 32, the stay cloth 31 is fixed via the attachment member 50 to this attachment hole 16. The structure for attaching the stay cloth 31 via the attachment member 50 to the side frame 10 is similar to the structure for attaching the stay cloth 32 except in that the stay cloth 31 is attached reversely with respect to the stay cloth 32 in the front to back direction of the seat and therefore the description thereof is omitted.

The attachment member 50 is integrally molded with a rigid resin. As shown in FIG. 5 and FIG. 7, the attachment member 50 is shaped so that a peripheral area of one side of a hollow cuboid is cut out. The attachment member 50 includes: a holding portion 51 which corresponds to a main body; and a plate-shaped flange portion 52 which is extended in all directions continuously from the other side which is located opposite to the cut-out one side of the holding portion 51. Here, the flange portion 52 corresponds to an extended portion. The holding portion 51 includes: a front wall 53; a horizontal wall 54; a rear wall 55; a horizontal wall 56; a top wall 57 extending rearward and vertically from an end portion of the front wall 53, which is located opposite to the flange portion 52; and a partition wall 58 bridged between the horizontal wall 54 and the horizontal wall 56 and provided in parallel with the front wall 53 and the rear wall 55. A space surrounded by the front wall 53, the horizontal wall 54, the rear wall 55, the horizontal wall 56, and the top wall 57 serves as the holding space 59 inside of which the trim plate 37 is locked. The holding space 59 is divided by the partition wall 58 into a front space 59a and a rear space 59b. In addition, in a case where the attachment member 50 is attached to the right side frame 10 of the vehicle seat S, the horizontal wall 54 is located at the upper side and the horizontal wall 56 is located at the lower side. In a case where the attachment member 50 is attached to the left side frame 10 of the vehicle seat S, the horizontal wall 54 is located at the lower side and the horizontal wall 56 is located at the upper side.

The front wall 53 is extended to stand substantially vertically from the flange portion 52 described below (to be inclined at an angle ranging from about 85 degrees to about 90 degrees with respect to the flange portion 52). In addition, the front wall 53 does not need to be extended to stand from the flange portion 52 in a planar manner, and it may be extended with stepped portions in such a way that the thickness decreases toward the rear wall 55 by about 0.5 mm as the front wall 53 separates from the flange portion 52 by about 5 mm. Thus, according to the holding portion 51 having the front wall 53 that includes the plural stepped portions, at the time of inserting the holding portion 51 into the attachment hole 16, a section of the holding portion 51, which has a small thickness and a small outer shape, is first inserted and therefore may be more easily inserted than the holding portion 51 that is formed vertically from the flange portion 52. In a state where the attachment member 50 is attached to the attachment hole 16, the front wall 53 is in contact with an inner surface of the attachment hole 16 while being substantially vertical to the attachment hole 16. Accordingly, compared with a case where the front wall 53 is formed to be inclined to the rear wall 55, rotation of the attachment member 50 is further prevented. Therefore, the attachment member 50 can be prevented from loosening from the attachment hole 16.

As shown in FIG. 5 and FIG. 7, the horizontal wall 54 and the horizontal wall 56 are formed of a substantially L-shape which is obtained such that one corner of a rectangle is cut out. Further, as shown in FIG. 6, a cut-out portion 57b shaped to be cut out toward the front wall 53 is formed in the center of the top wall 57 in the up to down direction. Here, the cut-out portion 57b corresponds to an opposite-side check window. The cut-out portion 57b is formed in this manner; thereby, the top wall 57 maintains an anti-loosening function for the trim plate 37, which is described below, and in addition, a connected state of the trim plate 37 can be checked through the cut-out portion 57b. In particular, in the up to down direction of the seat, corresponding to an elongation direction of the holding space 59, a total of lengths L1 and L2 of the top wall 57 is configured to be larger than a length L3 of the cut-out portion 57b. The top wall 57 is formed in this manner; therefore, the rigidity can be secured and the anti-loosening function can be improved. The horizontal wall 54, the horizontal wall 56, and the cut-out portion 57b of the top wall 57 totally form a substantially T-shaped opening. The stay cloth 32 and the trim plate 37 that are locked within the holding space 59 can be visually checked through this opening as viewed from the holding portion 51. In addition, by using this opening, a bridging portion 61 described below can be molded by a two-split mold for molding the holding portion 51 and the flange portion 52.

The rear wall 55 is formed continuously with the horizontal wall 54 and the horizontal wall 56 that are formed in a substantially L-shape. A height of the rear wall 55 from the flange portion 52 is configured to be smaller than a height of the front wall 53 from the flange portion 52. Further, the partition wall 58 is formed to have substantially the same height as the height of the rear wall 55; therefore, the front space 59a is exposed from the rear wall 55 of the attachment member 50.

Moreover, a slit 55s is formed in the center of the rear wall 55 in the up to down direction. This slit 55s is formed continuously with a slit 52s which is provided in the center of a rear portion of the flange portion 52. The rear wall 55 and the rear portion of the flange portion 52 are divided by these slits 52s, 55s into two portions with respect to the center. The slits 52s, 55s are formed continuously with the holding space 59 to communicate therewith and are used to insert the stay cloth 32 into the holding space 59. Specifically, an operator inserts the stay cloth 32 in a folded state through the slits 52s, 55s and spreads the stay cloth 32 within the holding space 59; therefore, the stay cloth 32 is inserted into the attachment member 50. Further, corner portions 55a of the rear wall 55 are formed to be chamfered so that the stay cloth 32 is prevented from being damaged by rubbing against the corner portions 55a when being inserted through the slit 55s into the holding space 59, the corner portions 55a being located adjacent to a portion in which the slit 55s intersects with the holding space 59. Furthermore, the rear wall 55 and the rear portion of the flange portion 52 are separated by the slits 52s, 55s; thereby, as is described in detail below, an end portion of the rear wall 55, which is located adjacent to the slit 55s is allowed to be deformed toward the front wall 53. In addition, the slit 55s corresponds to a cut.

As shown in FIG. 5 to FIG. 7, protrusions 60 are formed on an outer surface of the rear wall 55, which faces the rear side of the seat, to be located respectively at both sides between which the slit 55s is interposed. The protrusion 60 is formed as a wedge including: a surface 60a which faces the flange portion 52 to form nearly a right angle with respect to the rear wall 55; and a surface 60b which is located opposite to the flange portion 52 to form a small acute angle with respect to the rear wall 55. In addition, the protrusion 60 corresponds to a pawl portion. A distance between the surface 60a and the flange portion 52 is configured to be the same as or slightly larger than a thickness of the attachment hole 16 in the side frame 10. The surface 60a is a surface facing the flange portion 52, and a rim of the attachment hole 16 is supported between the surface 60a and the flange portion 52; thereby, the attachment member 50 can be prevented from loosening from the attachment hole 16. In addition, a portion of the holding portion 51, which is located adjacent to the flange portion 52 to have a thickness between the protrusion 60 and the flange portion 52, corresponds to a portion which faces the inner surface of the attachment hole. Moreover, in the case of insertion of the attachment member 50 into the attachment hole 16, the attachment member 50 is in a natural state where no force is applied. In this case, the protrusions 60 are in contact with the inner surface of the attachment hole 16; therefore, the insertion is inhibited. As described above, the rear wall 55 is separated by the slit 55s, and in addition, the protrusion 60 is formed as a wedge. Accordingly, when the attachment member 50 is pressed into the attachment hole 16, the protrusions 60 are brought into contact with the inner surface of the attachment hole 16. Therefore, a force from the front wall 53 is applied to the rear wall 55 to deform the rear wall 55. The rear wall 55 is deformed and thereby an outer periphery of the attachment member 50 becomes the same as or smaller than the inner surface of the attachment hole 16. Consequently, the attachment member 50 can be attached to the attachment hole 16.

The partition wall 58 and the front wall 53 are connected by the bridging portion 61 while being located at an outer end of the seat. The bridging portion 61 is provided as a short strip-shaped portion formed at the center in an up to down direction of the partition wall 58 and the front wall 53, and it forms a surface which is flash with the flange portion 52. A width of the bridging portion 61 in the up to down direction of the seat is configured to be smaller than a width of the cut-out portion provided at the center of the top wall 57. Therefore, the bridging portion 61 can be molded without using a core by the two-split mold for molding the holding portion 51 and the flange portion 52.

The bridging portion 61 serves as an anti-loosening portion which prevents the trim plate 37 and the end of stay cloth 32 which are inserted into the holding space 59, loosening from the holding space 59. Further, rigidity is increased by the bridging portion 61 compared with a case where two through-holes 62 described below are formed to be connected.

The top wall 57 is formed in a position to face the through-holes 62 described below. A protrusion 57a protruding toward the front space 59a is provided at an end of an inner surface of the top wall 57, the end being located adjacent to the rear wall 55. In a case where a force which pulls the trim plate 37 outside the front space 59a is received via the stay cloth 32 by the trim plate 37 at the time of expansion of the airbag 6b, this protrusion 57a functions as an anti-loosening portion which prevents the trim plate 37 inserted into the front space 59a from being pulled outside the front space 59a. This protrusion 57a includes: a flat surface formed by a surface which is located outside the front space 59a to be continuously formed with an end of the top wall 57; and a stepped portion of a substantially L-shaped hook provided on a surface which is located adjacent to the front space 59a. Therefore, the trim plate 37 can be inserted into the front space 59a manually. When the force pulling the trim plate 37 outside the front space 59a is applied, an end of the trim plate 37 is locked by this stepped portion; thereby, the trim plate 37 can be prevented from being easily pulled outside the front space 59a.

The flange portion 52 having a flat plate shape is provided with a contact surface 52a which makes contact with the side frame 10 and a presser surface 52b which is located on the reverse side of the contact surface 52a. The contact surface 52a is formed of a flat surface. The presser surface 52b has a curved surface 52c which includes a peripheral rim that curves toward the contact surface 52a so that an end of the presser surface 52b meets up with an end of the contact surface 52a. The flange portion 52 is formed so that a front portion at the front of the holding portion 51 is longer than a rear portion at the rear side of the holding portion 51; thereby, the stay cloth 32 can be prevented from being damaged by contact with a boundary portion between the side plate 11 and the front rim 12 of the side frame 10 at the time of assembling to the side frame 10. In addition, the through-holes 62 are formed in the flange portion 52 to extend in a direction along a penetrating direction of the attachment hole 16 in a state where the attachment member 50 is attached to the side frame 10 and which intersects with the surface of the flange portion 52. The through-holes 62 allow the attachment portion 36 of the stay cloth 32 housed in the front space 59a to be exposed and enable an operator to check an attached state of the attachment portion 36. The through-hole 62 corresponds to a check window.

FIG. 11 is a transverse sectional view showing a state where the end of the stay cloth 32 is attached via the attachment member 50 to the side plate 11 of the side frame 10. The attachment member 50 is inserted into the attachment hole 16 in such a way that a portion of the flange portion 52, which formed longer is provided at the front side and that an outer end surface of the holding portion 51, which is located at the flange portion 52 is brought into contact with the inner surface of the attachment hole 16 of the side frame 10. In this case, the rim of the attachment hole 16, which is located at the rear side is supported by the flange portion 52 and the protrusion 60 therebetween. The attachment member 50 is inserted into the attachment hole 16 in this manner; therefore, an attachment position of the attachment member 50 in the up to down and front to back directions can be more easily regulated by the attachment hole 16 and a contact surface of the attachment member 50, and in addition, the stay cloth 32 may be restricted from making contact with the end of the side frame 10 depending on a pulling direction of the stay cloth 32.

The trim plate 37 is held in the front space 59a to face a front surface of the partition wall 58 in a state where the trim plate 37 is sewn to the end of the stay cloth 32. The trim plate 37 and the end of the stay cloth 32 are in contact with an inner surface of the bridging portion 61. As described above, the trim plate 37 having rigidity higher than rigidity of the stay cloth 32 is fixed to the end of the stay cloth 32, and the attachment member 50 is inserted into the attachment hole 16 in a state where the trim plate 37 is held in the holding space 59. Therefore, durability of the stay cloth 32 receiving a tensile force generated by an expansion of the airbag 6b can be improved compared with a case where a hole is formed in the stay cloth 32 itself and a shaft of the side frame is inserted into the hole to fix the stay cloth 32. The stay cloth 32 is passed between the partition wall 58 and the top wall 57 to enter the rear space 59b and is passed through an opening of the rear space 59b, which is formed in the flange portion 52, to be introduced to the outer side of the attachment member 50.

The flange portion 52 is arranged so that the contact surface 52a is in contact with the side plate 11. In addition, the presser surface 52b of the flange portion 52 is pressed by the retainer 6c in a state where the stay cloth 32 is interposed between the presser surface 52b and the retainer 6c.

Next, checking a connected state between the attachment member 50 and the attachment portion 36 of the stay cloth 32 is described with reference to FIG. 9 to FIG. 11. FIG. 11 shows a state where the attachment portion 36 is passed through the slits 52s, 55s to penetrate through the rear space 59b and a state where the trim plate 37 and the end of the attachment portion 36 sewn to the trim plate 37 are housed in the front space 59a. In the present embodiment, a connected state where the attachment portion 36 is connected to the attachment member 50 as shown in FIG. 11 is defined as a normal state. In addition, other connected states are defined as inappropriate states. In the normal state, specifically, one end 37a of the trim plate 37, which is covered by the attachment portion 36, is located not adjacent to the top wall 57 but adjacent to the bridging portion 61, and sewn portions 38 of the attachment portion 36, which are sewn to the trim plate 37, are located not adjacent to the partition wall 58 but adjacent to the front wall 53.

In the normal state, a corner portion of the other end 37b of the trim plate 37 is located adjacent to the protrusion 57a formed at the top wall 57 and is exposed without being covered by the attachment portion 36; therefore, the corner portion of the end of the trim plate 37 easily gets stuck and engaged with the protrusion 57a. Moreover, in the normal state, the sewn portions 38 of the attachment portion 36 are located not adjacent to the partition wall 58 but adjacent to the front wall 53. In other words, the attachment portion 36 is sewn to the trim plate 37 to wrap around one end 37a of the trim plate 37 in a contact manner with the front wall 53, therefore being housed with the trim plate 37 in the front space 59a. As just described, the attachment portion 36 is arranged and trim plate 37 is housed in the front space 59a. Accordingly, at the time of expansion of the airbag, the trim plate 37 is moved by the attachment portion 36 that is pulled from the partition wall 58. In such case, the force can be prevented from being directly applied to the sewn portions 38. Consequently, a shear force to be applied to the sewn portions 38 can be reduced and the stability of connection between the attachment portion 36 and the trim plate 37 by the sewn portions 38 can be increased.

The through-holes 62 from which the attachment portion 36 housed in the front space 59a is exposed are formed in the flange portion 52 as described above; thereby, the connected state of the attachment member 50 with the stay cloth 32 viewed from the flange portion 52 can be checked. The through-holes 62 are formed in the flange portion 52 in this manner; therefore, in the normal state, the attachment portion 36 of the stay cloth 32 is exposed from the through-holes 62. In an inappropriate state where the sewn portions 38 are located adjacent to the partition wall 58, the trim plate 37 is exposed from the through holes 62. Therefore, an operator checks which is exposed from the through-holes 62, the attachment portion 36 or the trim plate 37; thereby, the operator can identify whether the connected state of the attachment member is normal or inappropriate. In addition, in a state where the attachment member 50 is attached to the attachment hole 16 of the side frame 10, the flange portion 52 is located at the outer side of the side frame 10. Thus, after the attachment member 50 is attached to the side frame 10, the connected state between the attachment portion 36 and the attachment member 50 can be identified from the outer side of the side frame 10.

On the other hand, the horizontal wall 54, the horizontal wall 56, and the cut-out portion 57b of the top wall 57 totally form the substantially T-shaped opening as described above; thereby, the connected state of the attachment member 50 with the stay cloth 32 viewed from the holding portion 51 can be checked. The substantially T-shaped opening is formed in this manner; thereby, as shown in FIG. 9, the attachment portion 36 and the trim plate 37 are exposed from the opening as viewed from the holding portion 51 that is located on the opposite side of the flange portion 52. The trim plate 37 held in the front space 59a is exposed, particularly, from the cut-out portion 57b. Therefore, the connected state, i.e., whether the attachment portion 36 is inserted into the front space 59a to be properly oriented can be identified by checking the presence or absence of exposure of the trim plate 37 from the cut-out portion 57b. In addition, in a state where the attachment member 50 is attached to the attachment hole 16 of the side frame 10, the holding portion 51 is located at the inner side of the side frame 10. Thus, after the attachment member 50 is attached to the side frame 10, the connected state between the attachment portion 36 and the attachment member 50 can be identified from the inner side of the side frame 10. Therefore, when viewed from the outer side of one side frame 10 of the right and left side frames 10, the connected state of the attachment member 50 attached to one of the side frames 10 with the attachment portion 36 can be identified from the through holes 62. Substantially in the same way, the connected state of the attachment member 50 attached to the other of the side frames 10 with the attachment portion 36 can be identified from the substantially T-shaped opening. Consequently, workability in checking the connected state is increased.

Further, as shown in FIG. 5 and described above, the heights of the rear wall 55 and the partition wall 58 from the flange portion 52 are configured to be smaller than the height of the front wall 53 from the flange portion 52 and therefore the front space 59a is exposed from the rear wall 55 of the attachment member 50. Accordingly, the connected state of the attachment member 50 with the stay cloth 32 viewed from the rear wall 55 can be checked. Therefore, an insertion direction of the attachment portion 36 into the front space 59a can be also checked from the rear wall 55 of the holding portion 51. Specifically, in a case where the trim plate 37 is exposed as viewed from the rear wall 55, an operator can identify, by checking as viewed from the rear wall 55, that the connected state is normal. In a case where the trim plate 37 is not exposed while being covered by the attachment portion 36, the operator can identify that the connected state is inappropriate. Furthermore, in a state where the attachment member 50 is attached to the attachment hole 16 of the side frame 10, the rear wall 55 of the holding portion 51 is posteriorly located in the side frame 10. Thus, even after the attachment member 50 is attached to the side frame 10, the connected state between the attachment portion 36 and the attachment member 50 can be checked from the rear side of the side frame 10.

Further, in an operation for checking the connected state of the aforementioned stay cloth 32 with the attachment member 50, in order to successfully identify the attachment portion 36 of the stay cloth 32, the trim plate 37, and particularly the holding portion 51 of the attachment member 50, in an embodiment, all of these members have different colors from one another. With the structure just described, a state of each member can be readily checked when the connected state is checked through the aforementioned through-holes 62 or the like. Furthermore, at least one of these members may have a different color from those of the other members. In particular, in an embodiment, the attachment portion 36 and the attachment member 50 have different colors from each other. With such structure just described, in particular, in a case where the attachment member 50 is in the normal state as viewed from the flange portion 52, the trim plate 37 is not exposed and only the attachment portion 36 is exposed. The connected state in this case is not identified by the fact that the trim plate 37 cannot be checked but it can be identified by checking the attachment portion 36 with a different color from a color of the flange portion 52.

In addition, as for colors, in an embodiment, greatly differing colors, particularly in brightness of three color elements (color phase, brightness, and intensity), are applied to the members. For example, in an embodiment, a color of black or the like having low brightness is applied to one of the member and colors of white or the like having high brightness are applied to the other members. Thus, even in a case where an area adjacent to the attachment member 50 is covered by the trim cover 4 to be shaded thereby, the members can be more easily identified by the differences in brightness and whether the connected state between the attachment portion 36 and the attachment member 50 is normal can be more easily identified through the aforementioned through-holes 62 or the like. Further, in a case where the attachment state is stored as an image, the differences in color can be more easily identified by the differences in contrast and connected states of the members can be more easily identified. Furthermore, in order to successfully identify the members, a fluorescent paint may be applied to at least one of the members, and the attachment member 50 may be made of a transparent resin.

The procedure to attach the end of the stay cloth 32 to the side frame 10 is described. First, the end of the attachment portion 36 of the stay cloth 32 to which the trim plate 37 is sewn is locked to the attachment member 50. The attachment of the stay cloth 32 to the attachment member 50 is performed in the following steps. One of two sides of the attachment portion 36, which are vertical to the trim plate 37 is passed through the slits 52s, 55s to be inserted into the rear space 59b. At this time, the trim plate 37 is provided to face the rear wall 55 while the end of the attachment portion 36 is provided to face the front wall 53. Second, the other one of the two sides of the attachment portion 36, which are vertical to the trim plate 37, is also passed through the slits 52s, 55s to be inserted into the rear space 59b; therefore, the attachment portion 36 is inserted into the rear space 59b. Next, one end 37a of the trim plate 37 is inserted from a clearance between the partition wall 58 and the top wall 57 into the front space 59a and is pushed thereinto until one end 37a of the trim plate 37 is brought into contact with the bridging portion 61. Therefore, the stay cloth 32 is completely connected to the attachment member 50.

Next, the attachment member 50 is inserted from the outer side of the seat into the attachment hole 16 of the side frame 10, and the attachment member 50 is pushed to reach a position such that a portion on the inner surface of the attachment hole 16 extending at the rear side is made interposed between the flange portion 52 and the protrusion 60. At this time, specifically, when the attachment member 50 is pushed into the attachment hole 16 as described above, the protrusion 60 is brought into contact with the inner surface of the attachment hole 16 and a force from the front wall 53 is applied to the rear wall 55. Then, the rear wall 55 is deformed by the force; thereby, the holding portion 51 can be inserted into the attachment hole 16. When the attachment member 50 is further inserted to reach a position such that the protrusion 60 is moved beyond the inner surface of the attachment hole 16, the rear wall 55 is released from its deformed state and therefore the attachment member 50 is fitted into the attachment hole 16. Next, the airbag module 6 is assembled from the outer side of the seat. At this time, the airbag module is fixed by the bolt 18 in such a way that at least a portion of the flange portion 52 is pressed by the retainer 6c. Thereafter, the cushion pad 5a is arranged at the outer side of the airbag module 6 and the airbag module 6 and the cushion pad 5a are covered by the trim cover 4. Thus, the airbag module is completely assembled.

In addition, the structure where the connected state between the stay cloth and the attachment member is checked through the through-holes as viewed from the flange portion and the structure where the connected state between the stay cloth and the attachment member is checked through the cut-out portion as viewed from the holding portion are described as examples in the aforementioned embodiment, but not limited thereto. That is, a structure to check the connected state is not limited to a through-hole or a cut-out portion. As long as the inside of the attachment member can be checked, the structure may be configured, for example, so that a window made of a transparent resin is formed at least at a portion of the flange portion or the top wall. Accordingly, a connected portion between the stay cloth and the attachment member is exposed from the window and therefore the connected state of these members may be checked.

Second Embodiment

Figure 12:
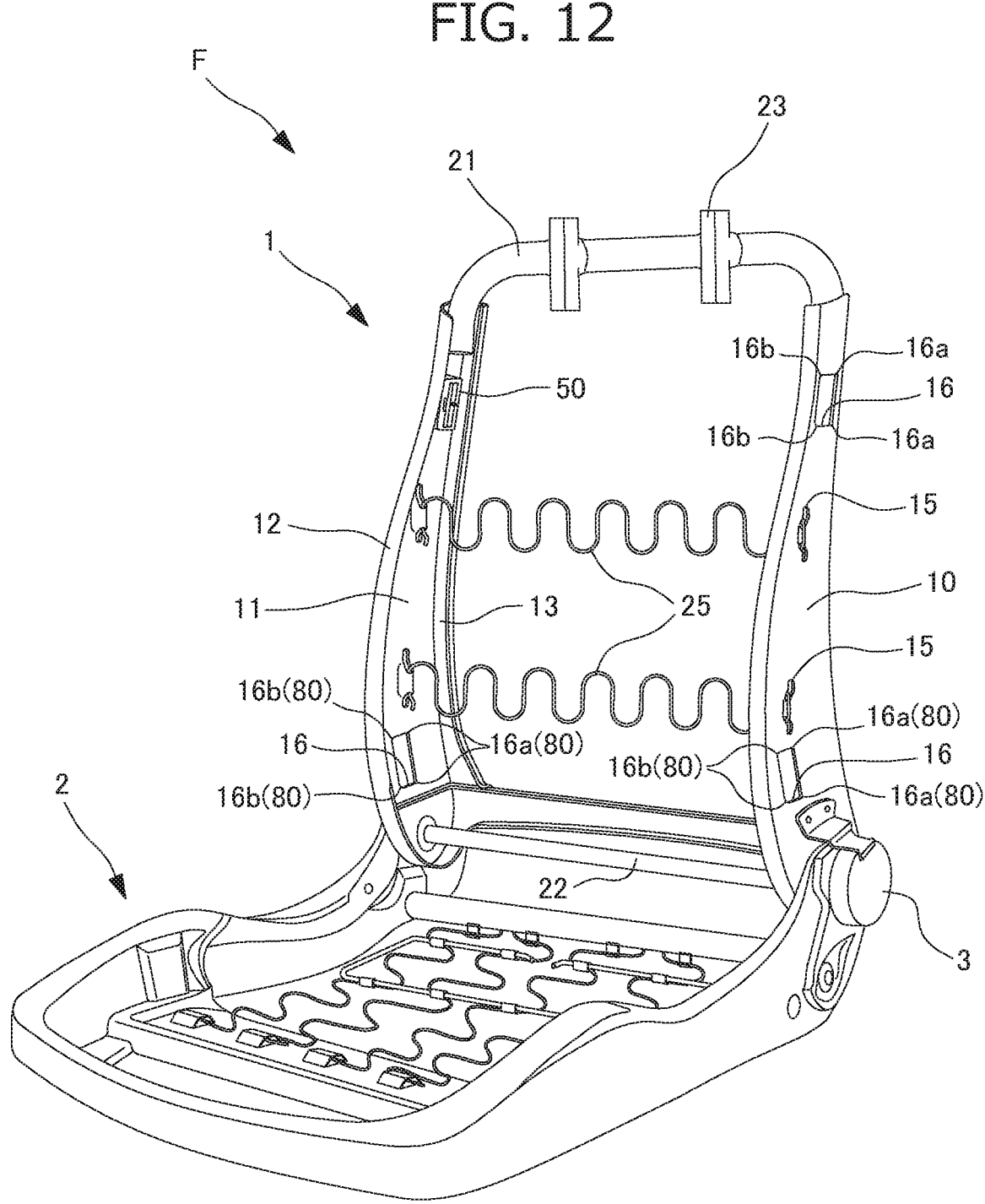
FIG. 12 is a perspective view of the seat frame of the seat equipped with an airbag module according to a second embodiment of the present disclosure.
Figure 13:
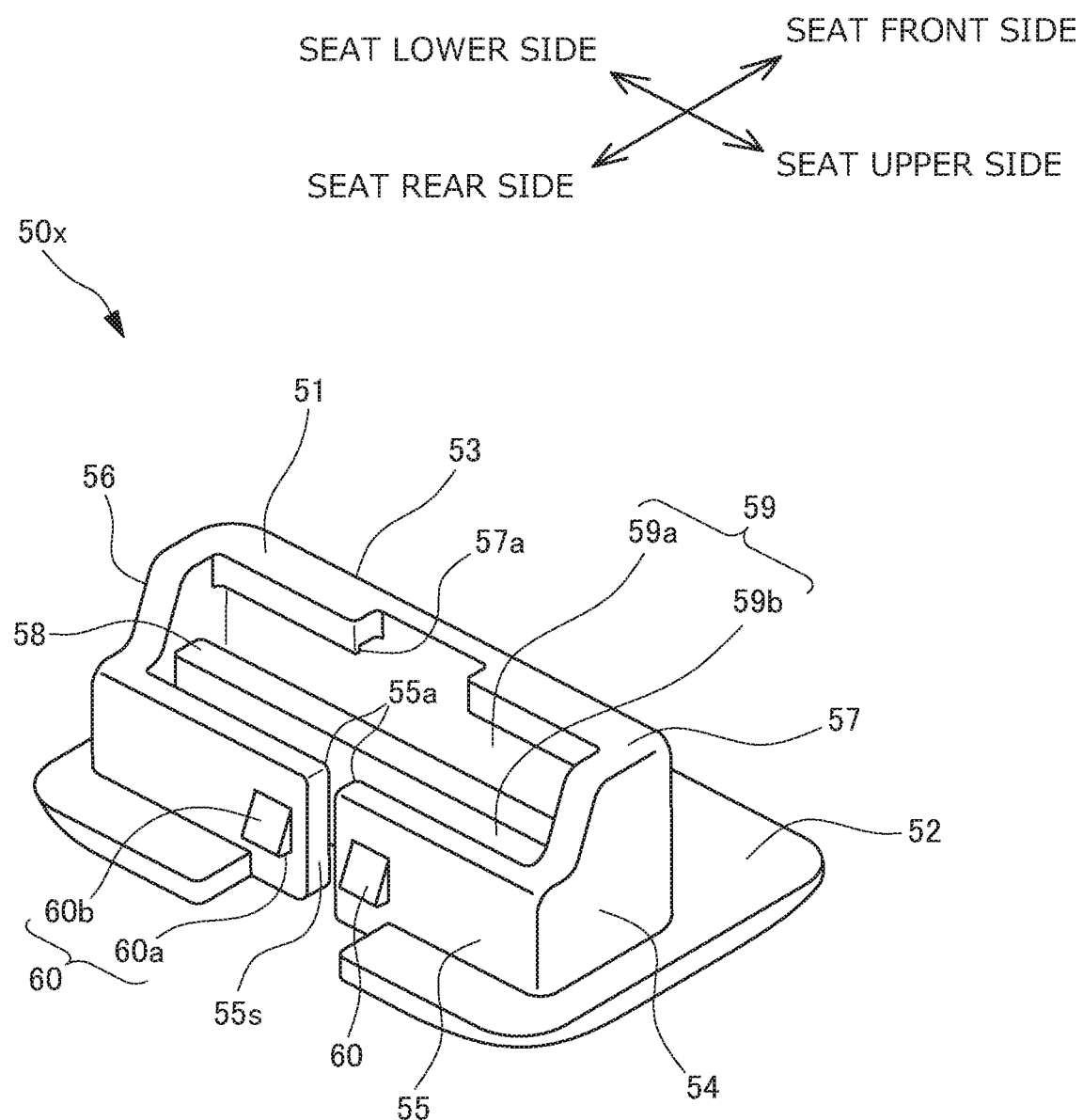
FIG. 13 is a perspective view of the attachment member according to the second embodiment of the present disclosure.
Figure 14:
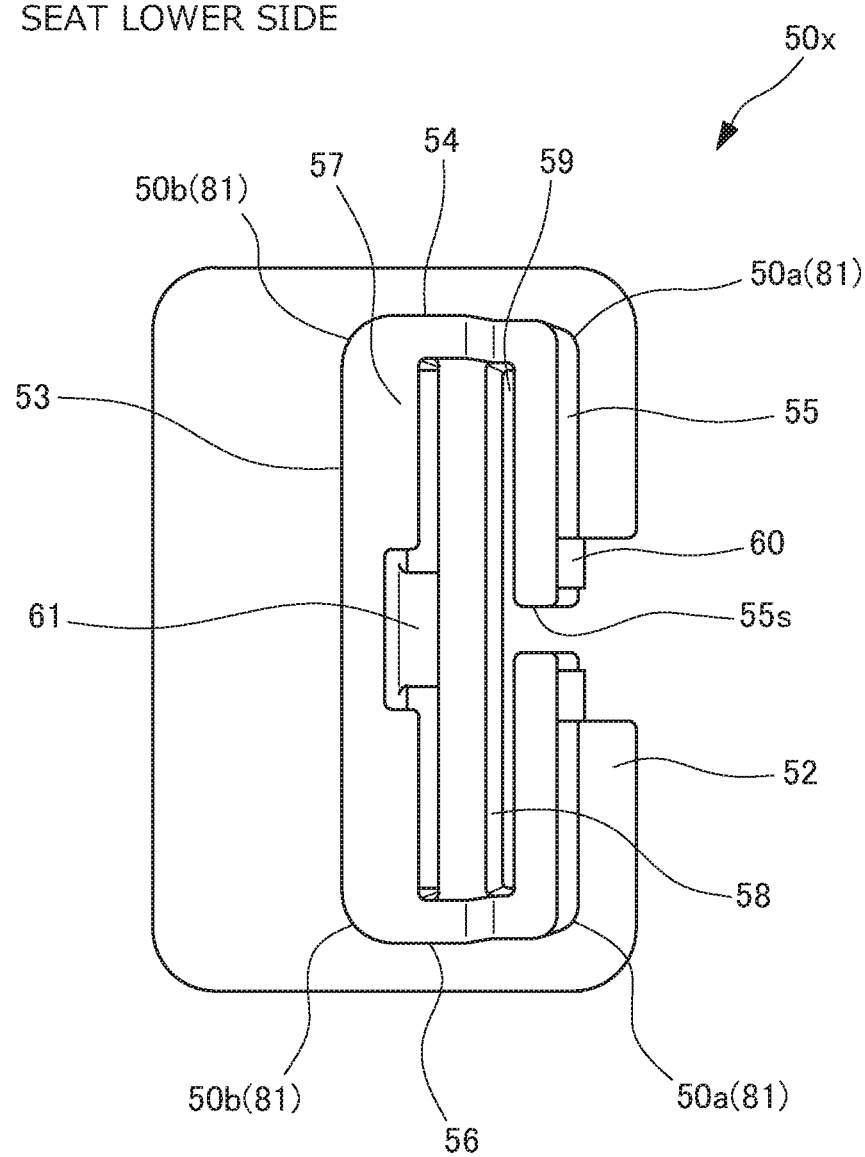
FIG. 14 is a plan view of the attachment member according to the second embodiment of the present disclosure.
Figure 15:
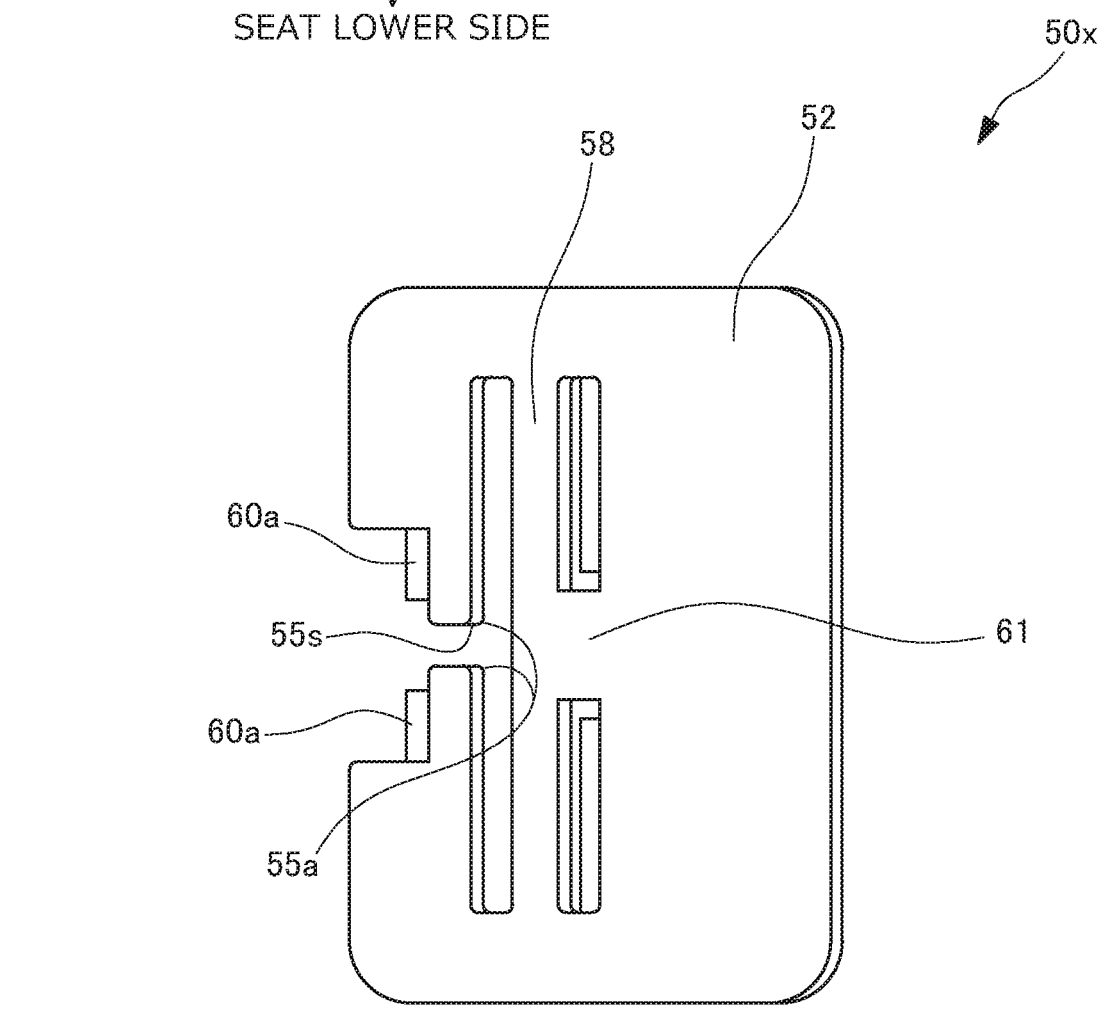
FIG. 15 is a bottom view of the attachment member according to the second embodiment of the present disclosure.
Figure 16:
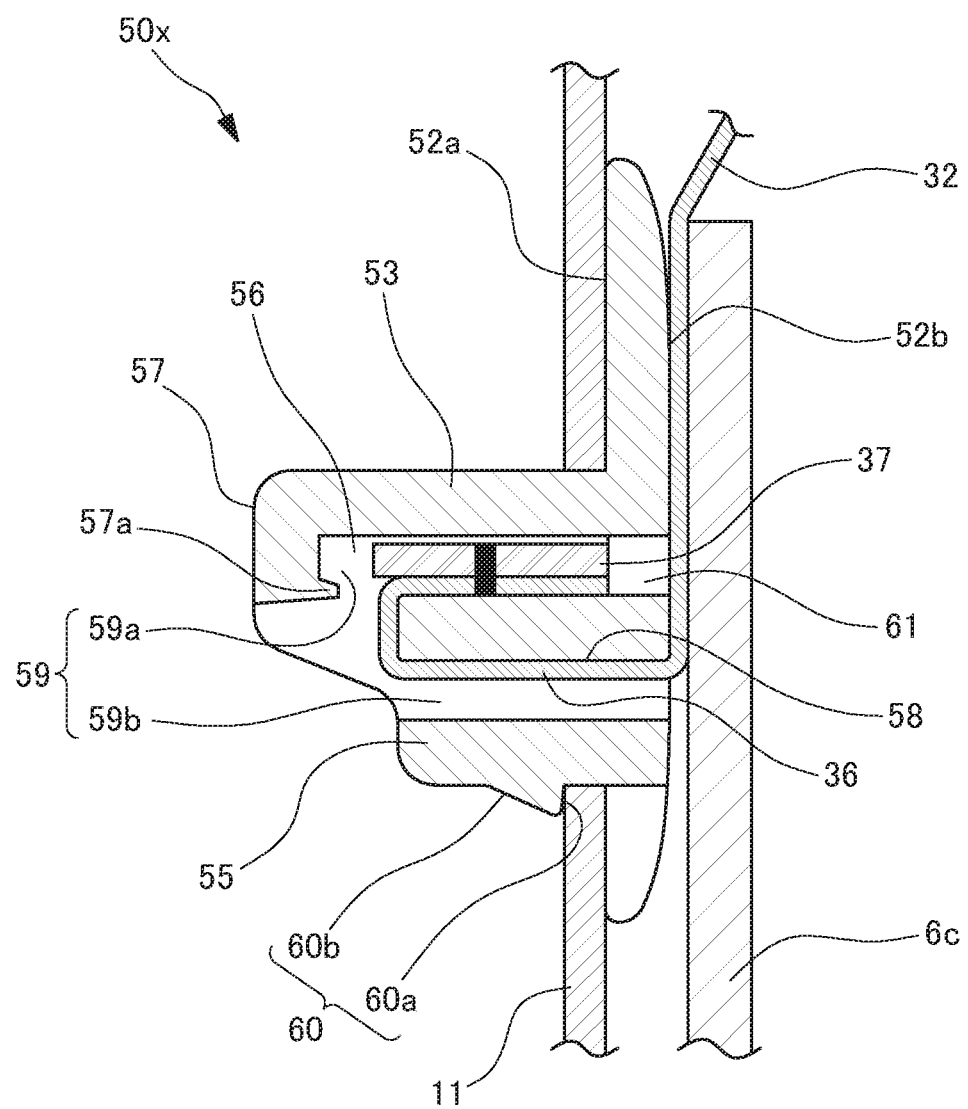
FIG. 16 is a cross-sectional explanatory drawing showing a state where the stay cloth is connected to the side frame via the attachment member according to the second embodiment of the present disclosure.
Figure 17:
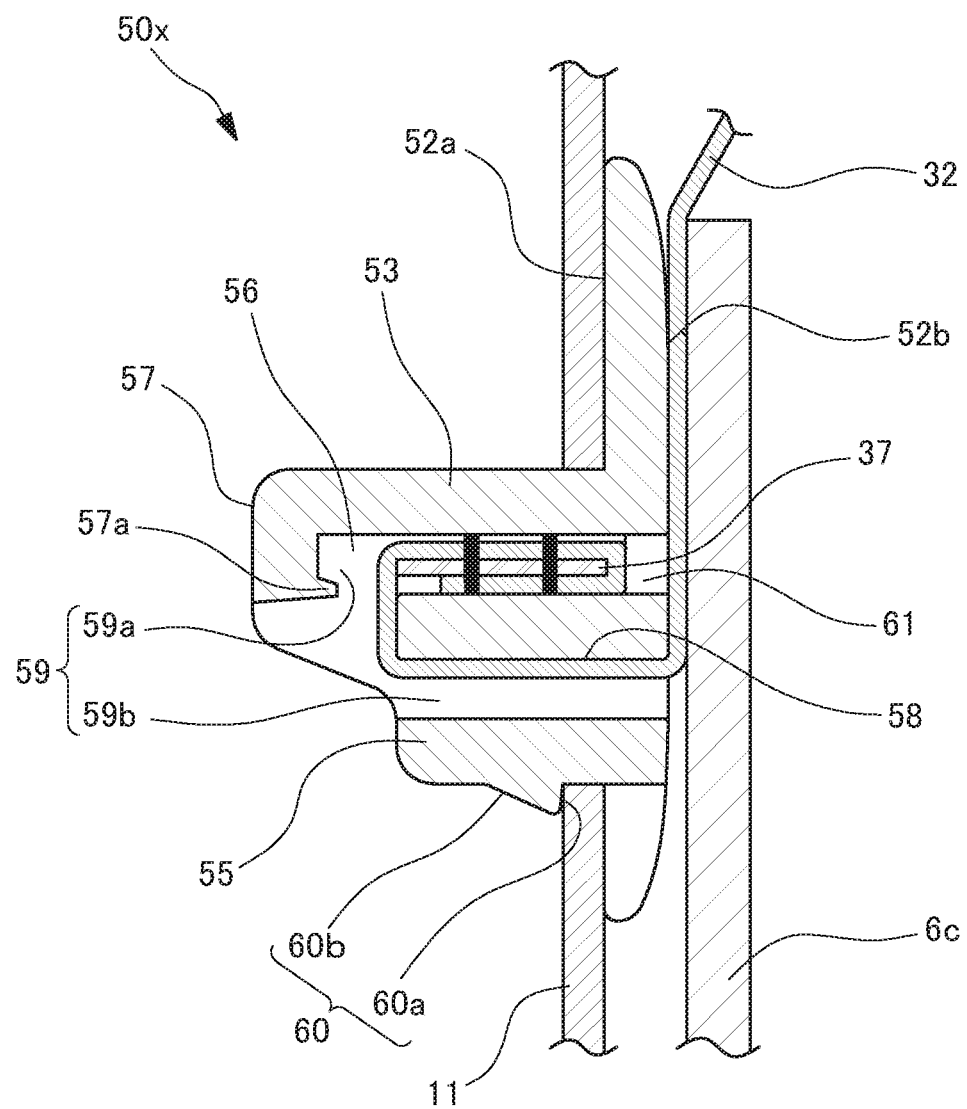
FIG. 17 is a cross-sectional explanatory drawing showing a state where the stay cloth is connected to the side frame via the attachment member according to the second embodiment of the present disclosure, illustrating a modified example of how to attach the stay cloth to the attachment member.

Next, the attachment member for attaching the guide member, according to a second embodiment of the present disclosure, to the side frame and the seat equipped with the airbag module including the attachment member is described with reference to FIG. 12 to FIG. 17. In addition, in the description below, the same reference numbers are assigned to structures that overlap those of the aforementioned embodiment and the description thereof is omitted, and differences from the aforementioned embodiment are clearly specified. FIG. 12 is a perspective view of the seat frame of the seat equipped with airbag module according to the second embodiment of the present disclosure. FIG. 13 is a perspective view of the attachment member according to the second embodiment of the present disclosure. FIG. 14 is a plan view of the attachment member according to the second embodiment of the present disclosure. FIG. 15 is a bottom view of the attachment member according to the second embodiment of the present disclosure. FIG. 16 is a cross-sectional explanatory drawing showing a state where the stay cloth is connected to the side frame via the attachment member according to the second embodiment of the present disclosure. FIG. 17 is a cross-sectional explanatory drawing showing a state where the stay cloth is connected to the side frame via the attachment member according to the second embodiment of the present disclosure, illustrating a modified example of how to attach the stay cloth to the attachment member.

The attachment hole 16 according to the present embodiment is a vertically-long substantially rectangular hole including two pairs of chamfered corner portions, each pair having a rear corner portion 16*a* and a front corner portion 16*b* that are provided in the front to back direction of the seat. The attachment hole 16 is provided in the side plate 11 to be located adjacent to the front rim 12 while extending along the inclination of the front rim 12. For example, a length of the long side of the attachment hole 16 is 33 mm and a length of the short side of the attachment hole 16 is 11 mm.

A radius of curvature of the front corner portion 16*b* is configured to be larger than a radius of curvature of the rear corner portion 16*a*. For example, a ratio of the radius of curvature of the front corner portion 16*b* to the radius of curvature of the rear corner portion 16*a* ranges from two to one to three to one. Further specifically, the radius of curvature of the front corner portion 16*b* is 2.5 mm and the radius of curvature of the rear corner portion 16*a* is 1 mm. Furthermore, an attachment member 50*x* which is fitted into the attachment hole 16 as described below includes: chamfered rear corner portions 50*a* and chamfered front corner portions 50*b* which are respectively formed to conform to the rear corner portion 16*a* and the front corner portion 16*b*. For example, a ratio of a radius of curvature of the front corner portion 50*b* to a radius of curvature of the rear corner portion 50*a* ranges from two to one to three to one, which identical to the ratio of the radius of curvature of the front corner portion 16*b* to the radius of curvature of the rear corner portion 16*a*. Further specifically, the radius of curvature of the front corner portion 50*b* is 2.5 mm and the radius of curvature of the rear corner portion 50*a* is 1 mm. The attachment hole 16 and the attachment member 50*x* described below are formed in this manner. Accordingly, when the attachment member 50*x* described below is being fitted into the attachment hole 16, the orientation of the attachment member 50*x* is restricted; therefore, a wrong assembly is prevented in advance. That is, the front corner portion 16*b* and the rear corner portion 16*a* function as wrong assembly preventing portions 80 for the assembly of the attachment member 50*x* described below to the attachment hole 16.

Further, in the description above, the radius of curvature of the front corner portion 16*b* is configured to be larger than the radius of curvature of the rear corner portion 16*a*. Alternatively, one corner portion on the inner surface of the attachment hole 16 is formed to have a radius of curvature which is different from radii of curvature of the other corner portions, and the attachment member 50*x* including a portion which has a shape conforming to the attachment hole 16 to face the inner surface is assembled to the attachment hole 16. Therefore, the same effect as that of the present embodiment can be attained. For example, in a case where corner portions on the inner surface of the attachment hole 16 have different radii of curvature, it is appropriate if the corner portions can restrict the mounting orientation of the attachment member 50*x*. The corner portions are not limited to those provided in the front to back direction of the seat and may be formed in each position in an up to down direction, an oblique direction, or the like.

Furthermore, in an embodiment, the plural attachment holes 16 having the same shape are formed in the side frame 10 in the up to down direction. Thus, in vehicles having different mounting heights of the airbag module 6, the attachment hole 16 to which the attachment member 50*x* is mounted is selectable and the seat frame F is used in common; thereby, versatility can be increased. In addition, in a case where the plural stay cloths 31, 32 are attached by using the attachment members 50*x*, the attachment members 50*x* having the same shape can be applied.

As shown in FIG. 13 and FIG. 14, in the attachment member 50*x*, the rear corner portions 50*a* are located at a portion in which the rear wall 55 intersects with the horizontal wall 54 and at a portion in which the rear wall 55 intersects with the horizontal wall 56 and the front corner portions 50*b* are located at a portion in which the front wall 53 intersects with the horizontal wall 54 and at a portion in which the front wall 53 intersects with the horizontal wall 56. These rear corner portions 50*a* and these front corner portions 50*b* are formed so that the radius of curvature of the front corner portion 50*b* is larger than the radius of curvature of the rear corner portion 50*a* as described above, thereby configuring wrong assembly preventing portions 81 relative to the inner surface of the attachment hole 16. In addition, the front corner portion 50*b* corresponds to one facing corner portion and the rear corner portion 50*a* corresponds to the other facing corner portion.

The rear corner portion 50*a* and the front corner portion 50*b* are formed in this manner; thereby, the stability of attachment of the attachment member 50*x* to the attachment hole 16 is held. Specifically, a large bending moment is applied to the front corner portion 50*b* of the front wall 53 about a portion of the attachment member 50*x* at which the inner surface of the attachment hole 16 is supported between the protrusion 60 and the flange portion 52, where the large bending moment is provided at a position distant from the portion of the attachment member 50*x*. An increase of this bending moment causes an increase of stress on the front corner portion 50*b*; however, the front corner portion 50*b* is formed to have the radius of curvature larger than the radius of curvature of the rear corner portion 50*a* as described above. Accordingly, stress concentration can be reduced. Therefore, the attachment member 50*x* can be prevented from being deformed by the increase of stress. Consequently, the attachment member 50*x* can be stably attached to the attachment hole 16. Moreover, the rear corner portion 50*a*, the front corner portion 50*b*, the rear wall 55, and the horizontal walls 54, 56 are extended to stand substantially vertically from the flange portion 52 (to be inclined at an angle ranging from about 85 degrees to about 90 degrees with respect to the flange portion 52). With the structure just described, the holding portion 51 can be molded without using the core by the two-split mold.

Further, the flange portion 52 is not formed in an area in a direction along the rear wall 55 from a position which intersects with the protrusion 60 to a position at which the slit 55s is provided. That is, the flange portion 52 is not formed in a location adjacent to the protrusion 60. The flange portion 52 is formed in this manner; thereby, the attachment member 50x including the protrusions 60 can be molded without the core by the two-split mold.

The attachment member 50x configured as described above includes the rear corner portion 50a and the front corner portion 50b that have the different radii of curvature. Therefore, the attachment member 50x can be prevented from being wrongly assembled to the attachment hole 16 without deteriorating an excellent moldability due to the two-split mold.

FIG. 16 is a cross-sectional view showing a state where the end of the stay cloth 32 is attached via the attachment member 50x to the side plate 11 of the side frame 10. In contrast to the structure shown of FIG. 11, in FIG. 16, the trim plate 37 is attached to face an inner surface of the front wall 53. In addition, as shown in FIG. 17, the stay cloth 32 is folded along with the width of the trim plate 37. Therefore, the trim plate 37 may be interposed between the stay cloth 32 in the front space 59a so that both surfaces of the trim plate 37 are in contact with the stay cloth 32. At this time, the stay cloth 32 makes contact with the inner surface of the front wall 53.

Further, in the present embodiment, a substantially entire surface of the presser surface 52b is pressed by the retainer 6c toward the side plate 11, but other embodiments are not limited thereto. At least a portion of the presser surface 52b may be pressed by the retainer 6c. In an embodiment, a front of the presser surface 52b in the front to back direction of the seat is pressed and therefore not only the presser surface 52b but also the stay cloth 32 is pressed together. Accordingly, a tensile force due to an expansion of the airbag 6b can be effectively inhibited from being transmitted to the attachment member 50x. Consequently, an expansion force of the airbag 6b can be smoothly transmitted by the stay cloth 32 to the breaking portion 40.

Furthermore, in the present embodiment, the presser surface 52b is pressed by the retainer 6c. Alternatively, the presser surface 52b may be pressed by the inflator 6a or the airbag 6b. In a case where the airbag 6b is arranged to be in contact with the presser surface 52b, the presser surface 52b does not receive a pressing force from the airbag 6b in general use; however, when the airbag 6b expands, the presser surface 52b is pressed toward the side plate 11. Moreover, in a case where the airbag 6b is configured to be retracted in a module case, the presser surface 52b may be pressed by the module case. Alternatively, a special member for pressing the presser surface 52b may be provided.

The procedure to attach the end of the stay cloth 32 to the side frame 10 is now described. First, the end of the attachment portion 36 of the stay cloth 32 to which the trim plate 37 is sewn is locked to the attachment member 50x. The attachment of the stay cloth 32 to the attachment member 50x is performed in the following steps. One of two sides of the attachment portion 36, which are vertical to the trim plate 37, is passed through the slit 55s to be inserted into the rear space 59b. At this time, the trim plate 37 is provide to face the rear wall 55 while the end portion of the attachment portion 36 is provided to face the front wall 53. Second, the other one of the two sides of the attachment portion 36, which are vertical to the trim plate 37, is also passed through the slit 55s to be inserted into the rear space 59b; therefore, the attachment portion 36 is inserted into the rear space 59b. Next, the trim plate 37 is reversed by 180 degrees and the end of the attachment portion 36 is folded toward the front space 59a. Then, the trim plate 37 is inserted from the clearance between the partition wall 58 and the top wall 57 into the front space 59a and is pushed thereinto until the end of the trim plate 37 is brought into contact with the bridging portion 61. Therefore, the stay cloth 32 is completely connected to the attachment member 50x.

Next, the attachment member 50x is inserted from the outer side of the seat into the attachment hole 16 of the side frame 10, and the attachment member 50x is pushed to reach a position such that the inner surface of the attachment hole 16 extending at the rear side is made interposed between the flange portion 52 and the protrusion 60. At this time, specifically, when the attachment member 50x is pushed into the attachment hole 16 as described above, the protrusion 60 is brought into contact with the inner surface of the attachment hole 16 and a force from the front wall 53 is applied to the rear wall 55. Then, the rear wall 55 is deformed by the force; thereby, the holding portion 51 can be inserted into the attachment hole 16. When the attachment member 50x is further inserted to a position such that the protrusion 60 is moved beyond the inner surface of the attachment hole 16, the rear wall 55 is released from its deformed state and therefore the attachment member 50x is fitted into the attachment hole 16. Next, the airbag module 6 is assembled from the outer side of the seat. At this time, the airbag module is fixed by the bolt 18 in such a way that at least a portion of the flange portion 52 is pressed by the retainer 6c. Thereafter, the cushion pad 5a is arranged at the outer side of the airbag module 6 and the airbag module 6 and the cushion pad 5a are covered by the trim cover 4. Thus, the airbag module is completely assembled.

In addition, as described in the present embodiment, the corner portions 50a and 50b having the different radii of curvature are formed at the attachment member 50x and the corner portions 50a and 50b having the different radii of curvature are formed on the inner surface of the attachment hole 16 into which the attachment member 50x is fitted; thereby, the attachment member 50x and the attachment hole 16 are prevented from being wrongly assembled to each other. Alternatively, a structure in which the attachment member 50x is fittable into the attachment hole 16 only when being oriented in one direction may be applied, but not limited thereto. For example, a portion of the attachment member 50x is formed to have a protrusion in a predetermined cross-section and one location of the inner surface of the attachment hole 16 may be formed to fit to the predetermined cross-sectional protrusion when the attachment hole 16 is expanded in cross-section. In addition, only when the attachment member 50x is oriented in a predetermined direction, the attachment member 50x and the attachment hole 16 may be fitted to each other. On the other hand, a portion of the attachment member 50x is recessed in a predetermined cross-section and a protrusion having a cross-section fittable to the predetermined cross-sectional recessed shape may be formed at one location of the attachment hole 16. In addition, only when the attachment member 50x is oriented in a predetermined direction, the attachment member 50x and the attachment hole 16 may be fitted to each other.

Third Embodiment

Figure 18:
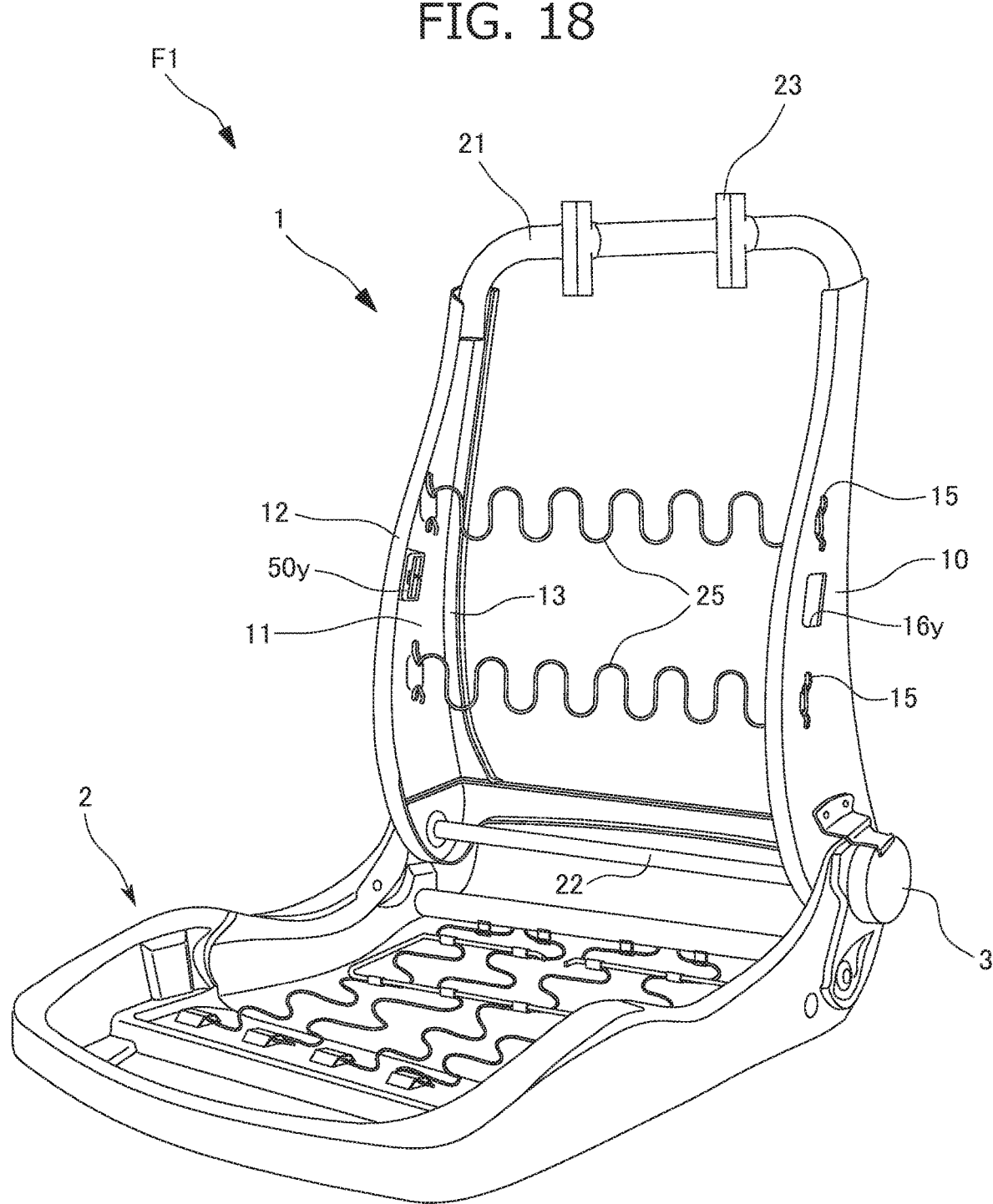
FIG. 18 is a perspective view of the seat frame of the seat equipped with airbag module according to a third embodiment of the present disclosure.
Figure 19:
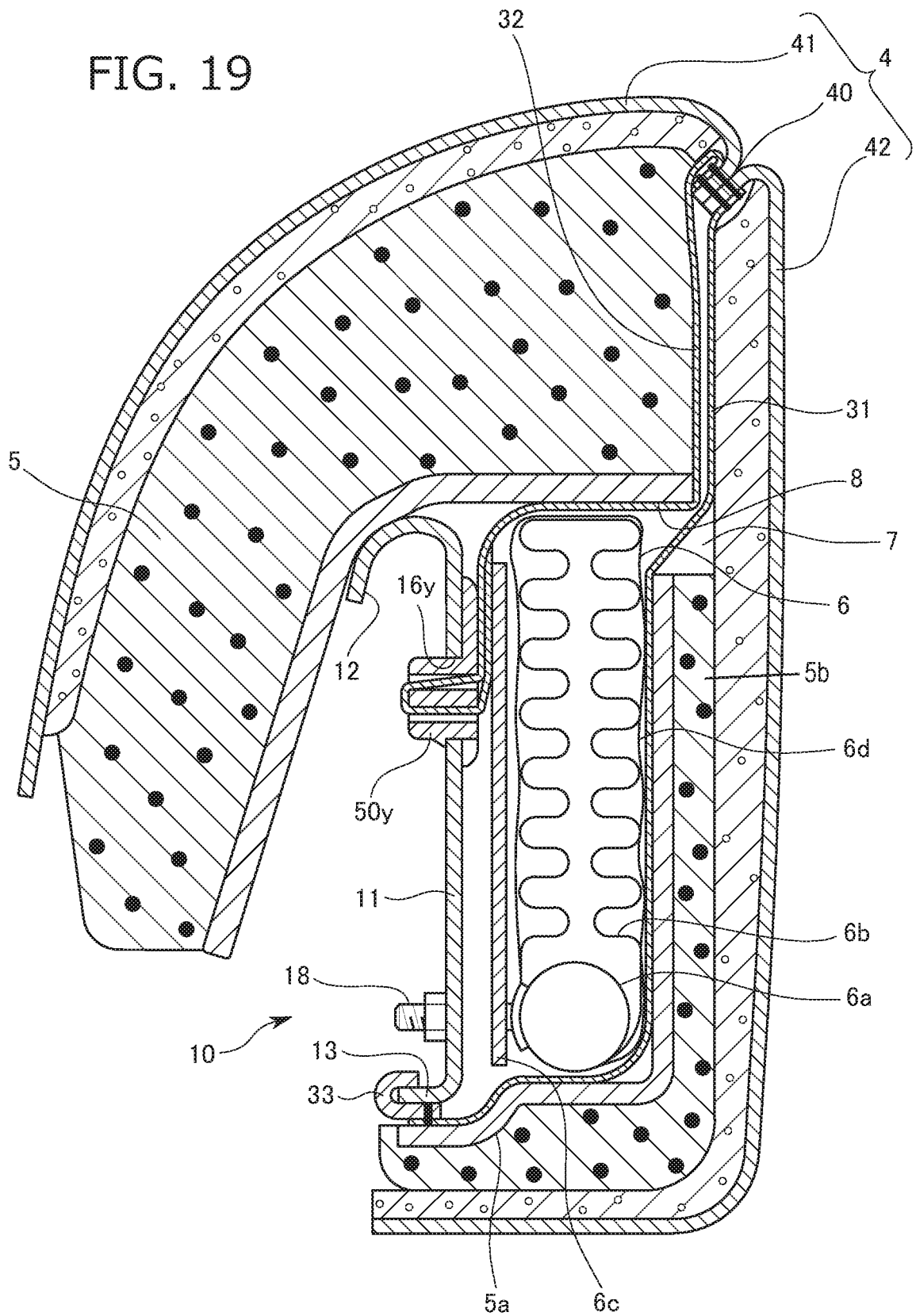
FIG. 19 is a partial, cross-sectional view taken along the line A-A of FIG. 1 of the seat equipped with airbag module according to the third embodiment and is an explanatory drawing showing a state where the stay cloth is connected to the side frame via the attachment member according to the third embodiment of the present disclosure.
Figure 20:
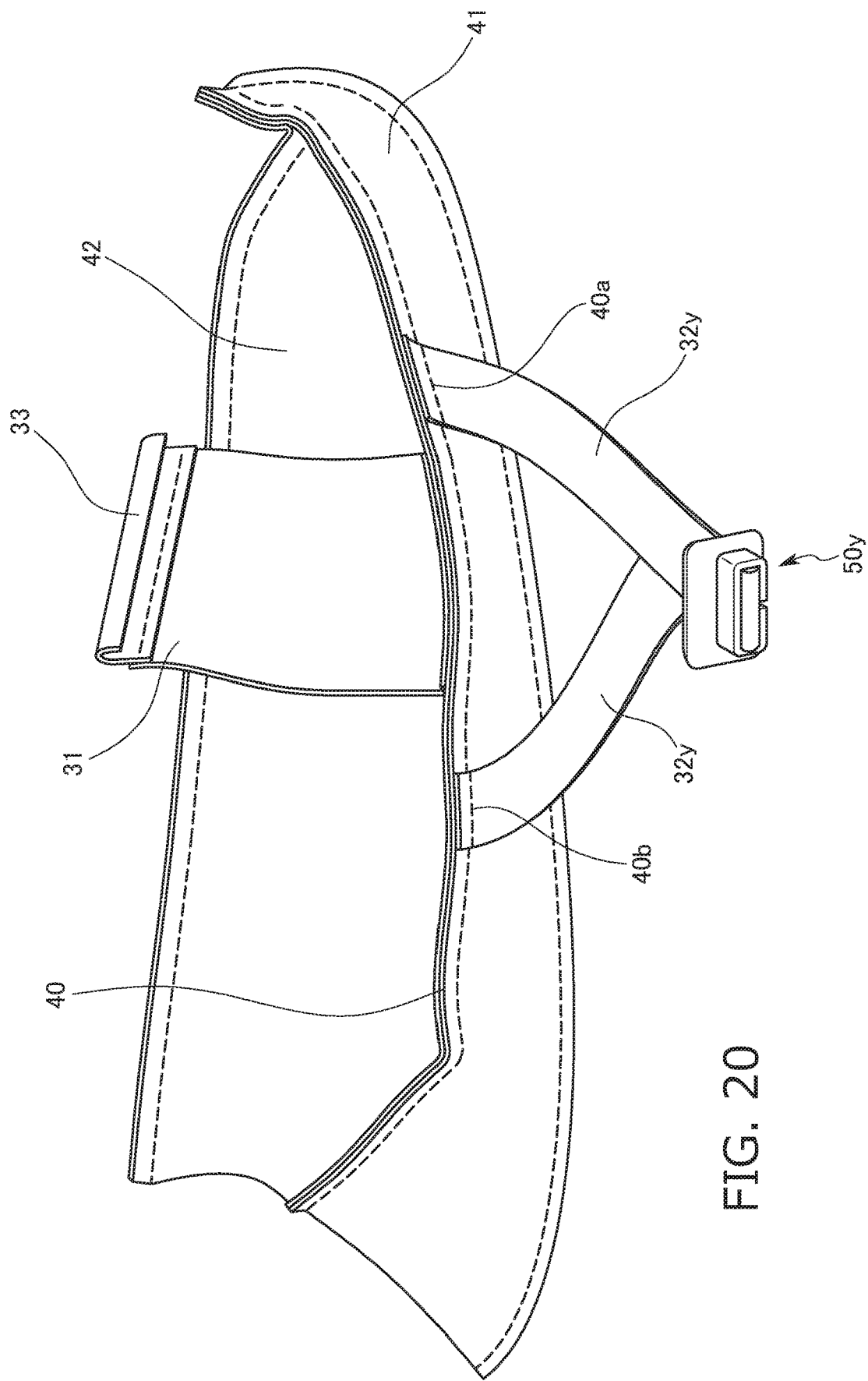
FIG. 20 is an explanatory drawing showing a state where the trim cover according to the third embodiment of the present disclosure and the stay cloths are sewn together on the breaking portion.
Figure 21:
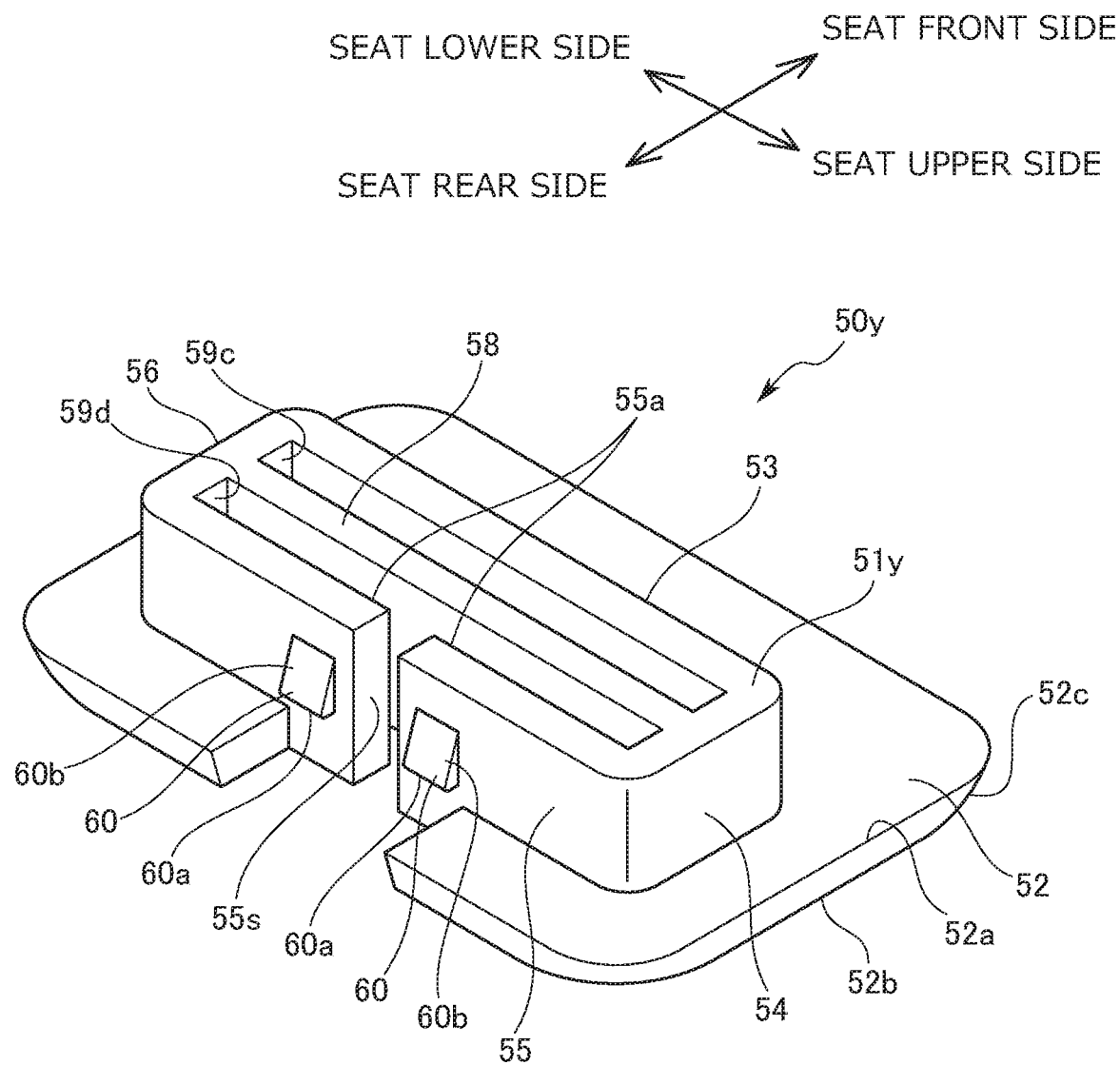
FIG. 21 is a perspective view of the attachment member according to the third embodiment of the present disclosure.
Figure 22:
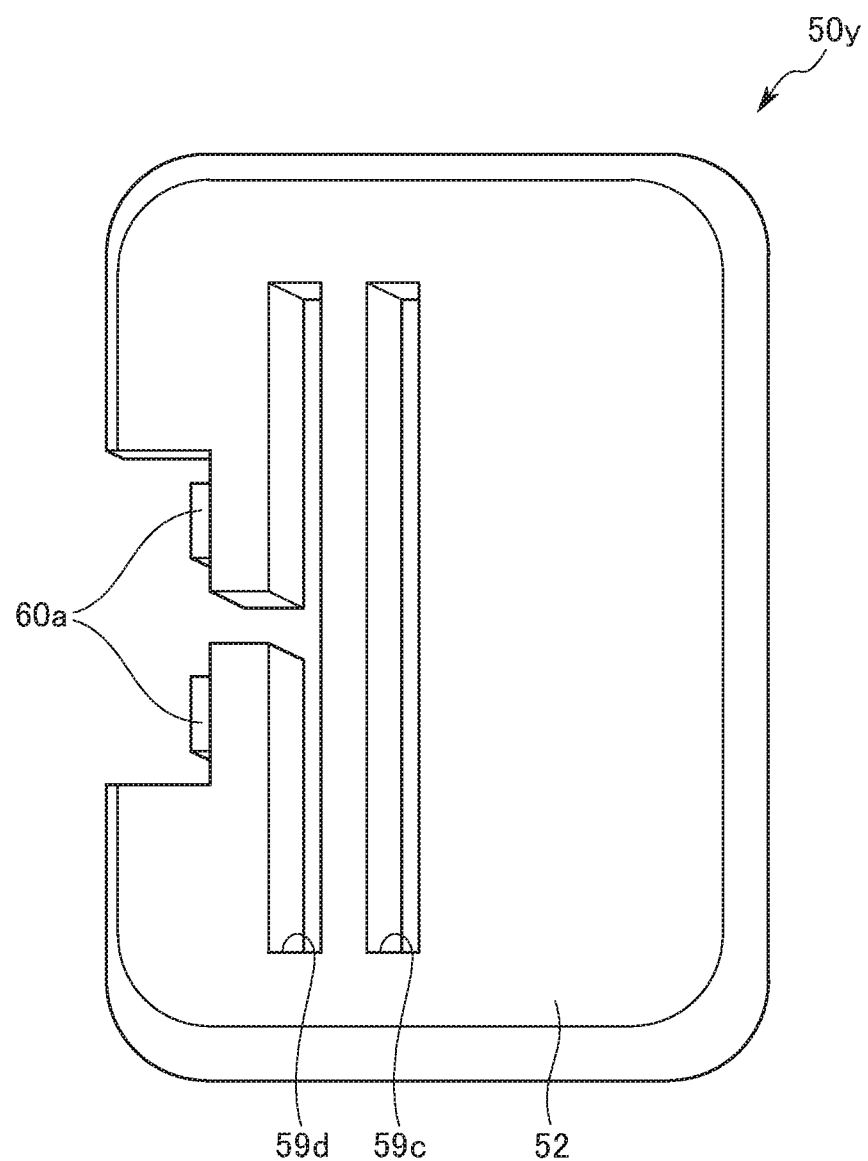
FIG. 22 is a bottom view of the attachment member according to the third embodiment of the present disclosure.
Figure 23:
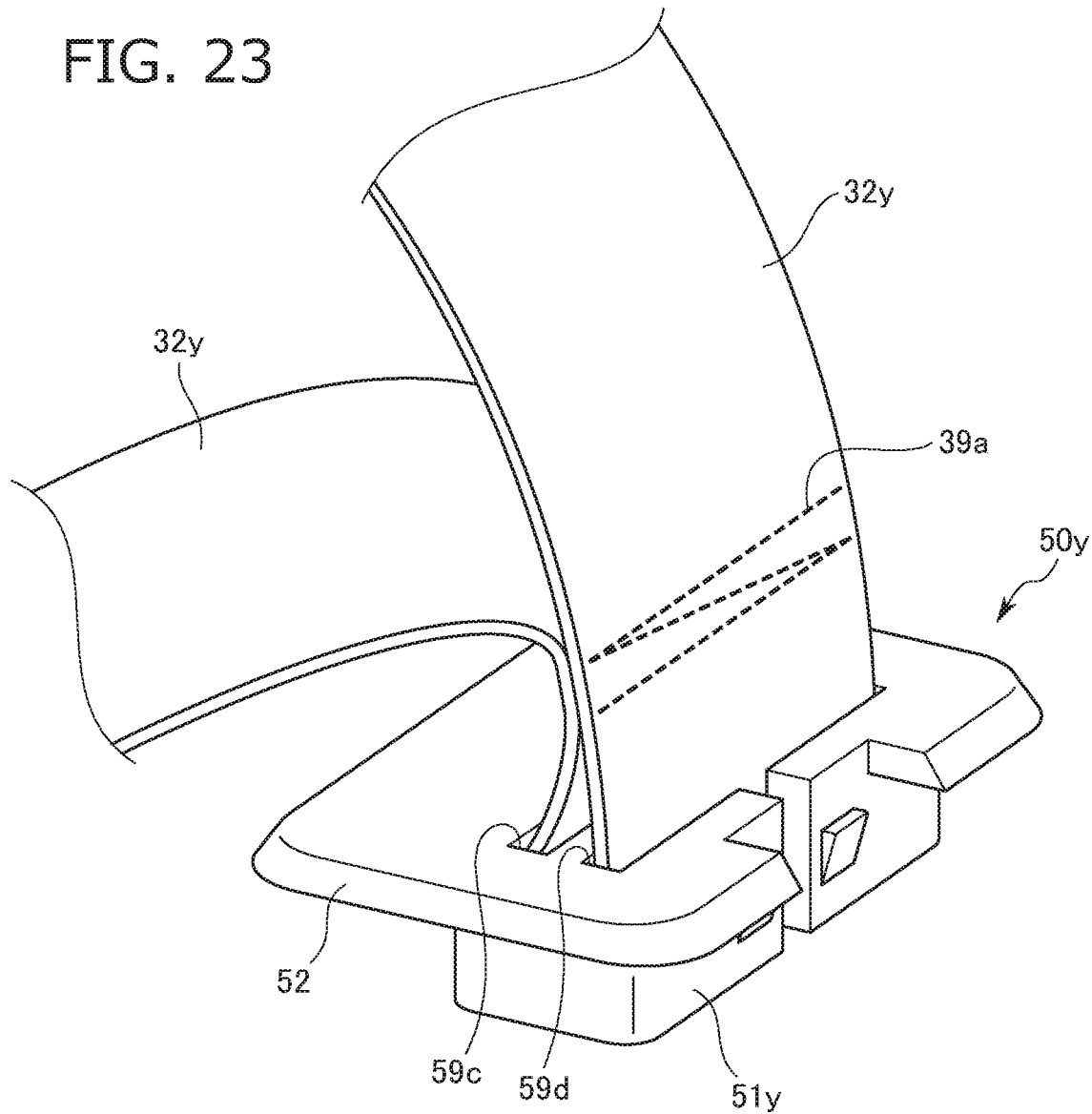
FIG. 23 is a perspective view showing a state where the stay cloth is attached to the attachment member according to the third embodiment of the present disclosure in a manner to be folded and subsequently separated into two portions to be sewn up.
Figure 24:
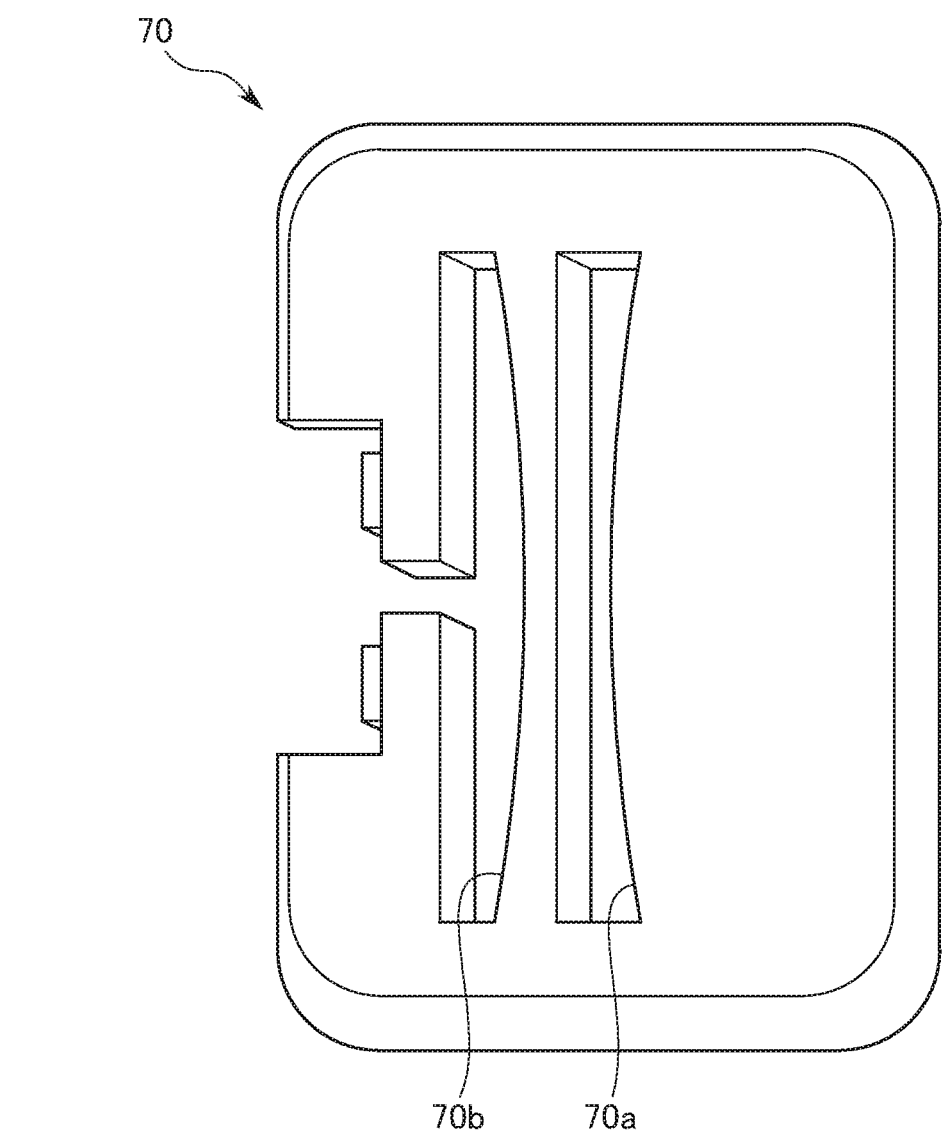
FIG. 24 is a bottom view of the attachment member according to a first modified example of an embodiment.
Figure 25:
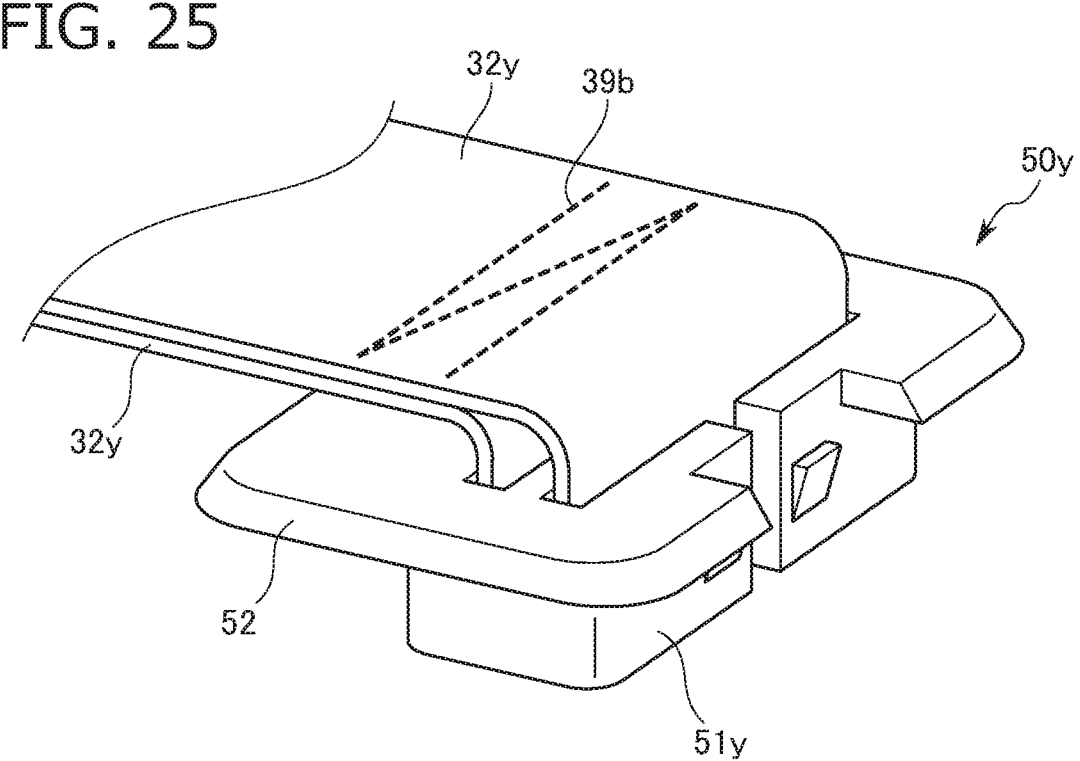
FIG. 25 is a perspective view showing a state where the stay cloth is attached to the attachment member according to a reference example in a manner to be folded and, subsequently, to be sewn up in an overlapping state.
Figure 26:
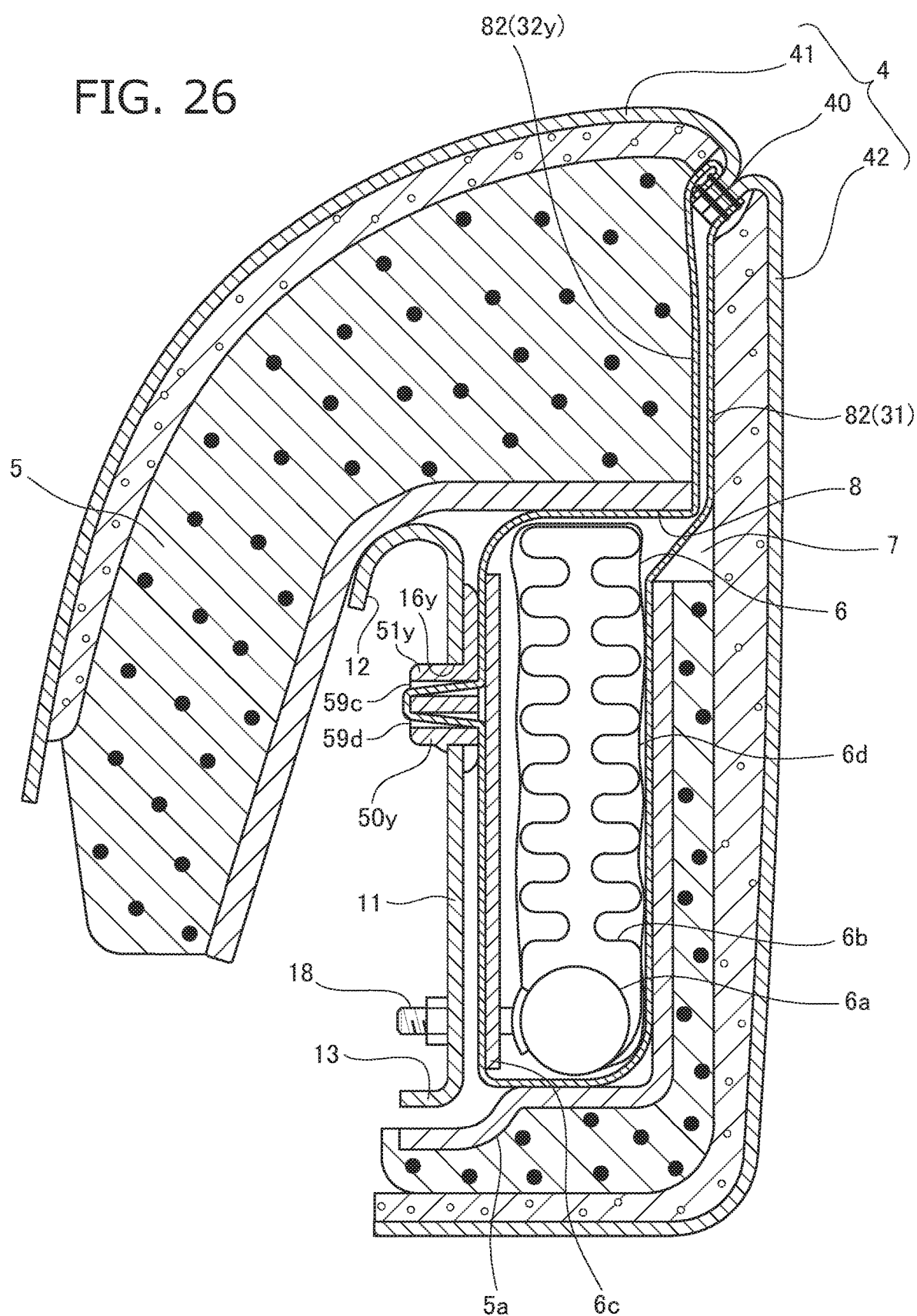
FIG. 26 is a partial, cross-sectional view taken along the line A-A of FIG. 1 of the seat equipped with airbag module according to the third embodiment and is an explanatory drawing showing a state where the stay cloth is attached to the attachment member according to a second modified example of an embodiment to be separated into two portions while being extended at a front side and a rear side.

Next, the vehicle seat according to a third embodiment is described with reference to FIG. 18 to FIG. 26, and such vehicle seat corresponds to the seat equipped with the airbag module of the present disclosure and includes the attachment member for attaching the guide member according to the present embodiment to the side frame. In addition, in the description below, the same reference numbers are assigned to structures that overlap those of the aforementioned embodiments and the description thereof is omitted, and differences from the aforementioned embodiments is clearly specified. FIG. 18 is a perspective view of the seat frame of the seat equipped with airbag module according to the third embodiment of the present disclosure. FIG. 19 is a partial, cross-sectional view taken along the line A-A of FIG. 1 of the seat equipped with airbag module according to the third embodiment and is an explanatory drawing showing a state where the stay cloth is connected to the side frame via the attachment member according to the third embodiment of the present disclosure. FIG. 20 is an explanatory drawing showing a state where the trim cover according to the third embodiment of the present disclosure and the stay cloths are sewn together on the breaking portion. FIG. 21 is a perspective view of the attachment member according to the third embodiment of the present disclosure. FIG. 22 is a bottom view of the attachment member according to the third embodiment of the present disclosure. FIG. 23 is a perspective view showing a state where the stay cloth is attached to the attachment member according to the third embodiment of the present disclosure in a manner to be folded and subsequently separated into two portions to be sewn up. FIG. 24 is a bottom view of the attachment member according to a first modified example of an embodiment. FIG. 25 is a perspective view showing a state where the stay cloth is attached to the attachment member according to a reference example in a manner to be folded and, subsequently, to be sewn up in an overlapping state. FIG. 26 is a partial, cross-sectional view taken along the line A-A of FIG. 1 of the seat equipped with airbag module according to the third embodiment and is an explanatory drawing showing a state where the stay cloth is attached to the attachment member according to a second modified example of an embodiment to be separated into two portions while being extended at the front side and the rear side.

The seat back S1 according to the third embodiment mainly includes the side plates 10, and the strip-shaped stay cloth 31 and a stay cloth 32$y$, one end of which is sewn to the breaking portion 40 of the trim cover 4. In addition, the trim cover 4 corresponds to a surface material and the stay cloth 32$y$ corresponds to a strip-shaped member or the guide member.

The locking portions 15 provided with the locking holes to which ends of each of a pair of bridging members 25 formed of S springs for supporting an occupant from behind are respectively locked, and a pair of attachment holes 16$y$ each for attaching an attachment member 50$y$ are provided at the side frames 10 that configure a seat frame F1. The attachment hole 16$y$ is a substantially rectangular hole which is elongated in the up to down direction, and it is provided to extend along the inclination of the front rim 12. Further, the attachment hole 16$y$ is formed to be provided in a position which is substantially at the center in a height direction, which is lower than the bolt 18 described below, which is located adjacent to the front rim 12 of the side plate 11 in the front to back direction, and which is located at the front side of the bolt 18 described below. The attachment hole 16$y$ is formed in such a position; thereby, the position of the attachment member 50$y$ to be fitted into the attachment hole 16$y$ is determined. In addition, the stay cloth 32$y$ separated into two portions extending forward from the attachment member 50$y$ that is shown in FIG. 19 and described below can be prevented from interfering with the bolt 18. Moreover, for example, a length of the long side of the attachment hole 16$y$ is 33 mm and a length of the short side of the attachment hole 16$y$ is 11 mm.

Further, the structure where the attachment hole 16$y$ for attaching the inner-side stay cloth 32$y$ is formed only in one location adjacent to the front rim 12 of the side frame 10 and the attachment member 50$y$ is attached to this attachment hole is applied in the present embodiment; however, the present disclosure is not limited to this embodiment. For example, both the inner-side stay cloth 32$y$ and the outer-side stay cloth 31 may be attached to the side frame 10 by using the attachment members 50$y$. In such case, it is only necessary to also provide the attachment hole 16$y$ for attaching the outer-side stay cloth 31 in a location adjacent to the rear rim 13.

Furthermore, the pair of attachment holes 16$y$ is provided substantially at the center in the height direction of the side plates 11 as described above; however, the present disclosure is not limited to this embodiment. For example, plural pairs of attachment holes 16$y$ may be provided in the height direction. Alternatively, the attachment hole 16$y$ may be formed in the side frame 10 only at one side at which the airbag module 6 is provided. In addition, in a case where the pair of attachment holes 16$y$ is formed in the side frames 10 at the both sides, the seat back frame 1 can be used in common, for example, for a passenger seat and a driver seat in which the airbag modules 6 are attached at different sides from each other, therefore increasing versatility.

As shown in FIG. 20, the stay cloth 32$y$ is formed by a fabric which is separated from the attachment member 50$y$ into two portions in the up to down direction. As shown in FIG. 19, the stay cloth 32$y$ is pulled from the breaking portion 40 into the space 7. The stay cloth 32$y$ is locked via the attachment member 50$y$ to the attachment hole 16$y$ of the side frame 10. Further, as shown in FIG. 19, the locking hook 33 is sewn to the end of the stay cloth 31 to be fixed thereto. The stay cloth 31 is pulled into the space defined between the cushion pad 5$a$ that is arranged at the rear side of the airbag module 6 and the airbag module 6, and the locking hook 33 is locked to the rear rim 13 of the side frame 10. In addition, the outer-side stay cloth 31 may be attached to the side frame 10 by using the attachment member 50$y$.

The attachment member 50$y$ is integrally molded with a rigid resin. As shown in FIG. 21 to FIG. 23, the attachment member 50$y$ includes: a substantially cuboid holding portion 51$y$ having a front through-hole 59$c$ and a rear through-hole 59$d$ which extend substantially in parallel with each other; and the plate-shaped flange portion 52 extended in all directions on a surface which is substantially vertical to the front through-hole 59$c$ and the rear through-hole 59$d$ in the holding portion 51$y$.

The holding portion 51$y$ corresponds to the main body and includes the front wall 53, the horizontal wall 54, the rear wall 55, the horizontal wall 56, and the partition wall 58 that is bridged between the horizontal wall 54 and the horizontal wall 56 to extend in parallel with the front wall 53 and the rear wall 55 and that is provided as a partition portion. The front through-hole 59$c$ or the rear through-hole 59$d$ provided as other through-hole and having a substantially rectangular cross-section is formed to be surrounded by the front wall 53, the horizontal wall 54, the rear wall 55, the horizontal wall 56, and the partition wall 58. The front through-hole 59$c$ and the rear through-hole 59$d$ separated from each other by the partition wall 58 allow penetration of the stay cloth 32$y$ into the attachment member 50$y$.

The rear wall 55 is formed continuously with the horizontal wall 54 and the horizontal wall 56. The height of the rear wall 55 from the flange portion 52 is configured to be substantially the same as the height of the front wall 53 or the partition wall 58 from the flange portion 52.

Two rims of the front wall 53, which are located at the partition wall 58 and two rims of the rear wall 55, which are located at the partition wall 58 are formed to have a chamfered shape on the partition wall 58. The partition wall 58 is formed in this manner; thereby, the attachment member 50y can appropriately hold the stay cloth 32y that is in contact with the rims of the partition wall 58. Further, a width of the partition wall 58 in the front to back direction of the seat is configured to be larger than a width of the front through-hole 59c or the rear through-hole 59d in the front to back direction of the seat S. With the structure just described, even in a case where a tensile force due to the stay cloth 32y is applied, a predetermined rigidity by which the stay cloth 32y can be appropriately held is secured. Furthermore, the front through-hole 59c and the rear through-hole 59d that are formed in the holding portion 51y are formed in a direction which penetrates from the holding portion 51y to the flange portion 52 and intersects with the surface of the flange portion 52.

As shown in FIG. 23, the stay cloth 32y is passed from the flange portion 52 through one of the front through-hole 59c and the rear through-hole 59d. Thereafter, the stay cloth 32y located at the reverse side of the flange portion 52 is folded via the partition wall 58 and is passed through the other of the front through-hole 59c and the rear through-hole 59d to be extended out from the flange portion 52. Then, portions of the stay cloth 32 extended out from the flange portion 52 and located adjacent to the flange portion 52 are sewn to each other by a sewn portion 39a to make a predetermined angle, thereafter being attached to the attachment member 50y. The sewn portion 39a is provided as a connection portion. The stay cloth 32y is introduced from the opening of the flange portion 52 to the outer side of the attachment member 50y and is fixed to the side frame 10 while being overlaid on the partition wall 58 of the attachment member 50y. Therefore, compared with a case where a hole is formed in the stay cloth 32y itself and a shaft of the side frame 10 is inserted into the hole to fix the stay cloth 32y without using the attachment member 50y, the durability of the stay cloth 32y receiving a tensile force due to an expansion of the airbag 6b can be increased.

Moreover, the presser surface 52b of the flange portion 52 is pressed by the retainer 6c in a state where the stay cloth 32y is interposed between the presser surface 52b and the retainer 6c. As just described, the stay cloth 32y is disposed between the presser surface 52b of the flange portion 52 and the retainer 6c to be in a plane contact with these members, thereby being protected without being locally in contact with other portions. In particular, the sewn portion 39a of the stay cloth 32y is formed to be positioned between the flange portion 52 and the retainer 6c, thereby being protected.

The procedure to attach the ends of the stay cloths 31, 32y and the airbag module 6 to the side frame 10 is described. First, the stay cloth 32y is passed from the flange portion 52 through one of the front through-hole 59c and the rear through-hole 59d and then is folded to be overlaid on the partition wall 58. Thereafter, the stay cloth 32 is passed through the other of the front through-hole 59c and the rear through-hole 59d to be extended out from the flange portion 52. Then, as shown in FIG. 23, two separated portions of the stay cloth 32y extended from the front through-hole 59c and the rear through-hole 59d and located in a position to overlap the flange portion 52 are sewn with each other to make a predetermined angle, thereby forming the sewn portion 39a. Further, as shown in FIG. 20, the two separated portions of the stay cloth 32y are respectively sewn to the front gusset portion 41 and the side gusset portion 42 to be positioned at the front side of the seat, thereby forming an upper breaking portion 40a and a lower breaking portion 40b. At this time, the stay cloth 31 to which the locking hook 33 is sewn is also sewn to the front gusset portion 41 and the side gusset portion 42 to be positioned at the rear side of the seat.

In an embodiment, the upper breaking portion 40a is provided at a position adjacent to a height of the chest of an occupant and the lower breaking portion 40b is provided at a position adjacent to a height of the waist of the occupant. With the structure just described, at the time of expansion of the airbag 6b, a load from the stay cloth 32y for breaking can be locally applied to the upper breaking portion 40a and the lower breaking portion 40b and, to the positions adjacent to the chest and the waist. Therefore, the timing of inflating out of the airbag 6b can be accelerated at the positions adjacent to the chest and the waist that are required to be promptly protected.

Next, the trim cover 4 and the stay cloth 32y are integrally sewn; thereafter, the holding portion 51y of the attachment member 50y attached to the stay cloth 32y is inserted from the outer side of the seat into the attachment hole 16y of the side frame 10 and the attachment member 50y is pushed to reach a position such that a portion on the inner surface of the attachment hole 16y extending at the rear side is made interposed between the flange portion 52 and the protrusion 60. At this time, specifically, when the attachment member 50y is pushed into the attachment hole 16y as described above, the protrusion 60 is brought into contact with the inner surface of the attachment hole 16y and a force from the front wall 53 is applied to the rear wall 55. Then, the rear wall 55 is deformed by the force; thereby, the holding portion 51y can be inserted into the attachment hole 16y. When the attachment member 50y is further inserted to a position such that the protrusion 60 is moved beyond the inner surface of the attachment hole 16y, the rear wall 55 is released from its deformed state and therefore the attachment member 50y is fitted into the attachment hole 16y. Further, the locking hook 33 sewn to the stay cloth 31 is locked to the rear rim 13. As described above, the stay cloths 31, 32y are attached to the side frame 10 by the attachment member 50y and the locking hook 33.

Next, the airbag module 6 is assembled from the outer side of the seat, and the cushion pad 5a is arranged at the outer side of the airbag module 6 and the airbag module 6 and the cushion pad 5a are covered by the trim cover 4. Thus, the airbag module is completely assembled.

In the attachment member 50y according to the aforementioned embodiment, a rear surface of the front wall 53, which configures the front through-hole 59c has a chamfered corner portion formed at the flange portion 52 and a radius of curvature of the chamfered corner portion may be configured to increase toward the upper side of the seat. A rear surface of the partition wall 58, which configures the rear through-hole 59d has a chamfered corner portion formed at the flange portion 52 and a radius of curvature of the chamfered corner portion may be configured to increase toward the lower side of the seat. With the structure just described, the stay cloth 32y can be smoothly extended and separated into two portions.

First Modified Example

The front through-hole 59c and the rear through-hole 59d of the attachment member 50y according to the aforementioned embodiment are described as through-holes each having a substantially rectangular cross-section; however, the present disclosure is not limited to a structure including the attachment member 50y according to this embodiment. For example, the front through-hole 59c and the rear through-hole 59d may have rims of a curved-surface shape or an inclination so that the stay cloth 32y can be easily sewn while being separated into two portions at a predetermined angle. For example, as shown in FIG. 24, in an embodiment, an attachment member 70 is configured to include: a front through-hole 70a formed by a curved wall surface of the front wall 53, which is a front rim surface of the front through-hole 70a; and a rear through-hole 70b formed by a curved wall surface of the partition wall 58, which is a front rim surface of the rear through-hole 70b. Specifically, the front rim surface of the front through-hole 70a is formed into a curved shape to be curved forward from the center to both ends in the up to down direction and the front rim surface of the rear through-hole 70b is formed into a curved shape to be curved rearward from the center to both ends in the up to down direction. The front through-hole 70a and the rear through-hole 70b are formed in this manner; thereby, a position of the stay cloth 32y inserted into these through-holes is changed in the up to down direction. Accordingly, the stay cloth 32y is extended from the flange portion 52 along the front rim surface of the front through-hole 70a while being smoothly separated into two portions. Consequently, the stay cloth 32y can be easily sewn while being separated into two portions at a predetermined angle.

Further, in the attachment member 50y, 70, the front through-hole 59c, 70a or the rear through-hole 59d, 70d may be formed to widen in a direction from the holding portion 51y to the flange portion 52. With the structure just described, the stay cloth 32y is extended from the flange portion 52 along the rim surface of the front through-hole 59c, 70a or the rear through-hole 59d, 70d while being smoothly separated into two portions.

In addition, the stay cloth 32y separated into two portions extends forward from the attachment member 50y, 70 (extends at the inner side of the airbag module 6) as described in the aforementioned embodiments, but other embodiments are not limited thereto. Alternatively, the stay cloth 32y extending rearward from the attachment member 50y, 70 (extending at the outer side of the airbag module 6) may be extended to be separated into two portions. Moreover, the attachment members 50y are attached at the front and rear sides without using the locking hook 33; thereby, the stay cloths 31, 32y at the both front and rear sides of the attachment members 50y may be extended to be separated into two portions.

Reference Example

As described in the aforementioned embodiment, the stay cloth 32y is sewn by the sewn portion 39a into two portions to be sewn by the upper braking portion 40a and the lower breaking portion 40b to the trim cover 4. Regarding this structure, for example, as a reference example shown in FIG. 25, an embodiment where portions of the stay cloth 32y extended from the front through-hole 59c and the rear through-hole 59d are sewn by a sewn portion 39b to overlap each other in the thickness direction may be proposed. In such case, the trim cover 4 can break more easily at the timing of expansion of the airbag 6b. That is, the two portions of the stay cloth 32y are sewn to the breaking portion 40 of the trim cover 4, thereby being stably sewn to the trim cover 4. In addition, an upper limit of a load applied to the breaking portion 40 can be increased to therefore easily break the trim cover 4.

Second Modified Example

As described in the aforementioned embodiments, the stay cloth 32y extends in only one direction, forward or rearward from the attachment member 50y, 70 while being separated into two portions, but not limited thereto. For example, as shown in FIG. 26, in an embodiment, a strip-shaped stay cloth 82 is passed through the front through-hole 59c and the rear through-hole 59d and both ends of the stay cloth 82 are sewn to the front gusset portion 41 and the side gusset portion 42 on the breaking portion 40, and the attachment member 50y may be attached to the side plate 11 so that the airbag module 6 is surrounded by the stay cloth 82 in the front to back direction. That is, the stay cloth 82 is separated into two portions from the attachment member 50y to extend forward and rearward, therefore being extended in two directions, i.e. at the inner and outer sides of the airbag module 6. Here, one of the two separated portions of the stay cloth 82, which extends at the inner side of the airbag module 6 in the seat width direction corresponds to an inner-side guide member. The other of the two separated portions of the stay cloth 82, which extends at the outer side of the airbag module 6 in the seat width direction corresponds to an outer-side guide member. As just described, the stay cloth 82 is attached by the attachment member 50y; thereby, the front and rear sides of the airbag module 6 can be covered without requiring two sheets of stay cloths or without requiring an additional attachment member 50y or an additional locking hook 33. Therefore, the number of components can be reduced and the stay cloth 82 can be more easily attached to the side plate 11.

The attachment member according to an embodiment of the present disclosure is an attachment member for attaching a guide member, which guides a deployment direction of an airbag module, to a frame member, the attachment member including a main body which has a housing portion for housing an end side of the guide member and which is inserted into an attachment hole to be fitted into the attachment hole that is formed in the frame member, wherein a check window is formed in the main body, the check window allowing the end side of the guide member in the housing portion to be exposed in a penetrating direction of the attachment hole in a state where the guide member is attached to the frame member.

Further, the attachment hole is formed in a side frame of a seat equipped with an airbag module, and a wrong assembly preventing portion which prevents the attachment member from being wrongly attached to the attachment hole is provided. The wrong assembly preventing portion may be formed at least at a portion of the attachment member which faces an inner surface of the attachment hole.

Furthermore, a seat equipped with an airbag module which retracts an airbag includes: the attachment member; the side frame that extends along a side portion of the seat equipped with airbag module; the airbag module that is attached to the side frame; and the guide member for guiding the deployment direction of the airbag module, and the wrong assembly preventing portion may be formed at least at a portion where the inner surface of the attachment hole and the attachment member face each other.

Moreover, the seat includes a cushion pad arranged on the frame member and a surface material covering the frame member and the cushion pad, and the guide member may be separated from the main body into two portions to be attached to the surface material.

In addition, in an embodiment, the attachment member is located at the outer side in the seat width direction to be covered by the airbag module, the main body includes other through-holes, the guide member is passed through the foregoing other through-holes to be folded back and the guide member includes a connection portion for connecting the folded portions, the guide member is separated into two portions not by the connecting portion but by a portion located adjacent to the surface material, and the connection portion is positioned at the outer side in the seat width direction to overlap the attachment member in a state where the attachment member is attached to the frame member. According to the above-described structure, in a state where the attachment member is attached to the frame member, the connection portion is positioned at the outer side in the seat width direction to overlap the attachment member and is arranged between the attachment member and the airbag module; thereby, the connection portion can be protected.

Further, in an embodiment, a plate-shaped flange portion which is in contact with the frame member is formed at the attachment member and the connection portion is positioned at the outer side in the seat width direction to overlap the flange portion in a state where the attachment member is attached to the frame member. According to the above-described structure, in a state where the attachment member is attached to the frame member, the connection portion is positioned at the outer side in the seat width direction to overlap the flange portion and is arranged between the flange portion and the airbag module; thereby the connection portion can be protected.

Furthermore, in an embodiment, the guide member comprises one sheet of a strip-shaped member. According to the above-described structure, the guide member comprises one sheet of strip-shaped member; thereby, the number of components can be reduced.

Moreover, in an embodiment, the attachment member includes a partition portion by which the foregoing other through-holes are separated from each other, and the guide member is passed through one and the other of the foregoing other through-holes separated by the partition portion and is overlaid on the partition portion. According to the above-described structure, the guide member is overlaid on the partition portion; thereby, the guide member can be attached to the attachment member without using a separate member.

In addition, in an embodiment, one of the two portions of the guide member is provided as an inner-side guide member which passes through the inner side of the airbag module in the seat width direction while the other of the two portions is provided as an outer-side guide member which passes through the outer side of the airbag module in the seat width direction, the airbag module is assembled at the outer side of the attachment member in the seat width direction, and the attachment member is interposed between the airbag module and the frame member. According to the above-described structure, one of the two portions of the guide member is provided as the inner-side guide member that passes through the inner side of the airbag module in the seat width direction while the other of the two portions is provided as the outer-side guide member that passes through the outer side of the airbag module in the seat width direction; thereby, the inner-side guide member and the outer-side guide member can be attached by the single attachment member.

TABLE OF REFERENCE NUMERALS

S: vehicle seat (seat equipped with airbag module)
S1: seat back
S2: seating portion
S3: headrest
F, F1: seat frame
1: seat back frame (frame member)
2: seating frame
3: reclining mechanism
4: trim cover (surface material)
5, 5a: cushion pad
   5b: side pad portion
6: airbag module
   6a: inflator
   6b: airbag
   6c: retainer
   6d: wrapping material
7: space
8: opening
10: side frame (frame member)
11: side plate
12: front rim
13: rear rim
15: locking portion
16, 16y: attachment hole
   16a: rear corner portion
   16b: front corner portion
18: bolt
21: upper frame
22: lower frame
23: pillar supporting portion
25: bridging member
31, 32, 32y: stay cloth (strip-shaped member, guide member)
   32a: first guide member portion
   32b: second guide member portion
33: locking hook
35: side
   35a: guide member connection part
36: attachment portion (end side)
37: trim plate (fixing member)
   37a: one end
   37b: the other end
38: sewn portion
   38a: first sewn portion
   38b: second sewn portion
39a: sewn portion (connection portion)
39b: sewn portion
40: breaking portion (third sewn portion)
   40a: upper breaking portion
   40b: lower breaking portion
41: front gusset portion
42: side gusset portion
43: rear gusset portion
44: sewn portion
50, 50x, 50y: attachment member
   50a: rear corner portion (other facing corner portion)
   50b: front corner portion (one facing corner portion)
51, 51y: holding portion (main body)
52: flange portion (extended portion)
   52a: contact surface
   52b: presser surface
   52c: curved surface
52s, 55s: slit
53: front wall
54: horizontal wall
55: rear wall
   55a: corner portion
55s: slit (cut)
56: horizontal wall
57: top wall (anti-loosening portion)

57a: protrusion
57b: cut-out portion (opposite-side check window)
58: partition wall (partition portion)
59: holding space (housing portion)
  59a: front space
  59b: rear space
  59c: front through-hole (other through-hole)
  59d: rear through-hole (other through-hole)
60: protrusion (pawl portion)
60a, 60b: surface
61: bridging portion
62: through-hole (check window)
70: attachment member
  70a: front through-hole (other through-hole)
  70b: rear through-hole (other through-hole)
80, 81: wrong assembly preventing portion
82: stay cloth (strip-shaped member, guide member)

The invention claimed is:

1. A seat equipped with an airbag module comprising:
a seat back frame that includes a side frame that extends along a side portion of the seat;
a cushion pad that is mounted on the seat back frame;
the airbag module, containing an airbag therein and being attached to the side frame;
a guide member configured to guide a deployment direction of the airbag module;
an attachment member configured to attach the guide member to the side frame; and
an attachment hole that is provided in the side frame and into which the attachment member is fit;
wherein:
the attachment member is inserted into the attachment hole in a state where an end portion of the guide member is attached to the attachment member; and
at least a portion of the end portion of the guide member penetrates through the attachment hole.

2. The seat equipped with an airbag module according to claim 1, wherein:
the guide member comprises a first guide member portion and a second guide member portion; and
the first guide member portion and the second guide member portion are connected by a guide member connection part.

3. The seat equipped with an airbag module according to claim 2, wherein:
an end portion of the first guide member portion has a first sewn portion and an end portion of the second guide member portion has a second sewn portion;
the guide member is sewn with a cover of the seat at a third sewn portion; and
a length of the first sewn portion and a length of the second sewn portion are smaller than a length of the third sewn portion.

4. The seat equipped with an airbag module according to claim 3, wherein a length of the guide member connection part is smaller than the length of the third sewn portion.

5. The seat equipped with an airbag module according to claim 1, wherein at least a portion of the guide member is disposed in front of the airbag module.

6. The seat equipped with an airbag module according to claim 1, wherein:
the cushion pad comprises a side pad portion that is disposed at a side of the side frame;
an opening is provided in the side pad portion through which the guide member is inserted; and
the guide member contacts an edge of the opening.

7. The seat equipped with an airbag module according to claim 6, wherein at least a portion of the guide member is disposed in front of the opening.

8. The seat equipped with an airbag module according to claim 1, wherein:
the airbag module comprises an inflator; and
a rear end of the guide member is disposed in front of the inflator.

9. The seat equipped with an airbag module according to claim 1, wherein the guide member contacts a back surface of the cushion pad.

10. The seat equipped with an airbag module according to claim 1, wherein the guide member has a sewn portion that is sewn with a Z-shape.

11. A method for assembling an airbag module-equipped seat, comprising:
providing a seat back frame that includes a side frame that extends along a side portion of the seat;
attaching an end portion of a guide member configured to guide a deployment direction of the airbag module to an attachment member; and
inserting the attachment member into an attachment hole provided in the side frame from an outer side of the seat, so that at least a portion of the end portion of the guide member penetrates through the attachment hole, the attachment member being in a state where the end portion of the guide member is attached to the attachment member.

12. The method according to claim 11, further comprising:
mounting the airbag module to the side frame from an outer side of the side frame.

13. The method according to claim 12, further comprising:
arranging a cushion pad at an outer side of the airbag module; and
covering the airbag module and the cushion pad by a trim cover.

14. A seat equipped with an airbag module comprising:
a seat back frame that includes a side frame that extends along a side portion of the seat;
a cushion pad that is mounted on the seat back frame;
the airbag module, containing an airbag therein and being attached to the side frame;
a guide member configured to guide a deployment direction of the airbag module;
an attachment member configured to attach the guide member to the side frame; and
an attachment hole that is provided in the side frame and into which the attachment member is fit;
wherein:
the attachment member is inserted into the attachment hole in a state where an end portion of the guide member is attached to the attachment member;
at least a portion of the end portion of the guide member is disposed inside the attachment member and penetrates through the attachment hole;
the guide member has a sewn portion that is arranged outside the attachment member.

15. The seat equipped with an airbag module according to claim 14, wherein at least a portion of the guide member is disposed in front of the airbag module.

16. The seat equipped with an airbag module according to claim 14, wherein:
the cushion pad comprises a side pad portion that is disposed at a side of the side frame;

an opening is provided in the side pad portion through which the guide member is inserted; and the guide member contacts an edge of the opening.

17. The seat equipped with an airbag module according to claim 16, wherein at least a portion of the guide member is disposed in front of the opening.

18. The seat equipped with an airbag module according to claim 14, wherein:

the airbag module comprises an inflator; and a rear end of the guide member is disposed in front of the inflator.

19. The seat equipped with an airbag module according to claim 14, wherein the guide member contacts a back surface of the cushion pad.

20. The seat equipped with an airbag module according to claim 14, wherein the sewn portion of the guide member is sewn with a Z-shape.

* * * * *